US010190933B2

(12) United States Patent
Holland et al.

(10) Patent No.: US 10,190,933 B2
(45) Date of Patent: Jan. 29, 2019

(54) CRANKSHAFT BALANCER MACHINE

(71) Applicant: Dominion Technologies Group, Inc., Roseville, MI (US)

(72) Inventors: Scott Bradley Holland, Shelby Township, MI (US); Daniel Mark Mietling, Sr., Madison Heights, MI (US); Michael Edward Essad, Clinton Township, MI (US); Abraham Hamade, Shelby Township, MI (US)

(73) Assignee: Dominion Technologies Group, Inc., Roseville, MI (US)

( * ) Notice: Subject to any disclaimer, the term of this patent is extended or adjusted under 35 U.S.C. 154(b) by 93 days.

(21) Appl. No.: 15/340,206

(22) Filed: Nov. 1, 2016

(65) Prior Publication Data

US 2018/0120191 A1    May 3, 2018

(51) Int. Cl.
*G01M 1/24* (2006.01)
*G01M 1/34* (2006.01)
(Continued)

(52) U.S. Cl.
CPC .............. *G01M 1/34* (2013.01); *B23B 41/00* (2013.01); *G01M 1/22* (2013.01); *G01M 1/24* (2013.01);
(Continued)

(58) Field of Classification Search
CPC . B23B 41/12; B23B 2215/20; B23B 2270/48; B23B 41/00; G01M 1/34;
(Continued)

(56) References Cited

U.S. PATENT DOCUMENTS 1,605,310 A * 11/1926 Weaver .................... B21D 3/10
33/605
2,033,686 A * 3/1936 Davis .................. B23Q 1/5468
29/38 E
(Continued)

FOREIGN PATENT DOCUMENTS

DE           4326790 A1 *  2/1995  .............. G01M 1/34
JP           H4189454 A     7/1992

*Primary Examiner* — Daniel Howell
*Assistant Examiner* — Yasir Diab
(74) *Attorney, Agent, or Firm* — Harness, Dickey & Pierce, P.L.C.

(57) ABSTRACT

A crankshaft balancer machine for balancing a crankshafts having a measurement station configured to rotate the crankshaft to obtain vibration-related data, a transfer station configured to transfer the crankshaft between the measurement station and the correction station, and a correction station configured to drill at least a portion of the crankshaft to correct an imbalance in response to the imbalance data. The measurement station includes a base structure, a measurement bridge support, a plurality of flexural support legs extending therebetween, at least one sensor, and a drive system to spin the crankshaft and output imbalance data. The transfer station includes at least one lifting arm selectively engaging the crankshaft and supporting the crankshaft during transfer. The correction station includes a drilling device horizontally disposed to achieve a horizontal drill direction into the crankshaft to correct any imbalance according to a customized software protocol.

20 Claims, 27 Drawing Sheets

(51) Int. Cl.
  *B23B 41/00* (2006.01)
  *G01M 1/22* (2006.01)
  *B23B 41/12* (2006.01)

(52) U.S. Cl.
  CPC .......... *B23B 41/12* (2013.01); *B23B 2215/20* (2013.01); *B23B 2270/48* (2013.01)

(58) Field of Classification Search
  CPC ......... G01M 1/24; G01M 1/22; Y10T 408/05; Y10T 408/175; Y10T 408/16; Y10T 408/563; Y10T 408/5633; Y10T 408/56337
  See application file for complete search history.

(56) References Cited

U.S. PATENT DOCUMENTS

| | | | | |
|---|---|---|---|---|
| 2,235,393 | A * | 3/1941 | Baker | G01M 1/16 408/2 |
| 2,779,217 | A | 1/1957 | Stovall | |
| 2,783,649 | A | 3/1957 | Hope | |
| 3,295,413 | A | 1/1967 | De Coye De Castelet | |
| 3,934,963 | A | 1/1976 | Langlois | |
| 5,001,917 | A * | 3/1991 | Berstein | B21D 3/02 72/110 |
| 5,131,143 | A * | 7/1992 | Kirchberger | B23B 49/04 29/6.01 |
| 5,722,878 | A * | 3/1998 | Phillips | B24B 19/12 451/163 |
| 5,984,599 | A * | 11/1999 | Janssen | B23C 3/06 29/6.01 |
| 6,228,007 | B1 * | 5/2001 | Quak | B23B 41/12 408/51 |
| 6,233,810 | B1 * | 5/2001 | Asbeck | B23C 3/06 29/33 P |
| 6,786,093 | B2 * | 9/2004 | Miura | G01M 1/20 700/279 |
| 9,804,585 | B2 * | 10/2017 | Leverington | G05B 19/4097 |
| 2001/0020387 | A1 * | 9/2001 | Miura | G01M 1/24 73/462 |
| 2003/0230142 | A1 | 12/2003 | Tamura et al. | |
| 2006/0051171 | A1 * | 3/2006 | Sugata | B23Q 16/001 408/71 |
| 2011/0085865 | A1 * | 4/2011 | Yoshimoto | B23B 49/04 408/1 R |
| 2016/0033006 | A1 * | 2/2016 | Leverington | F16F 15/322 700/279 |

* cited by examiner

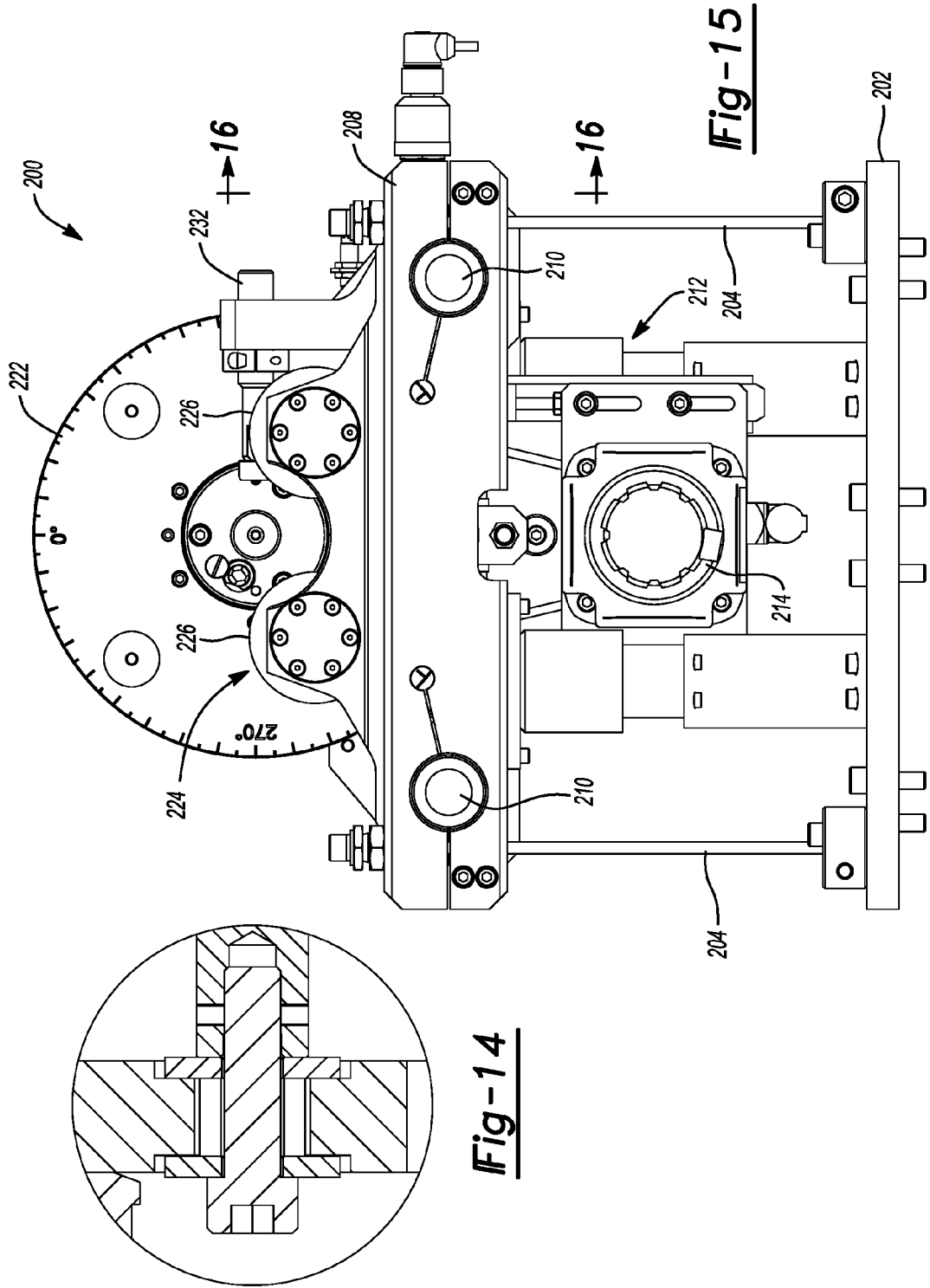

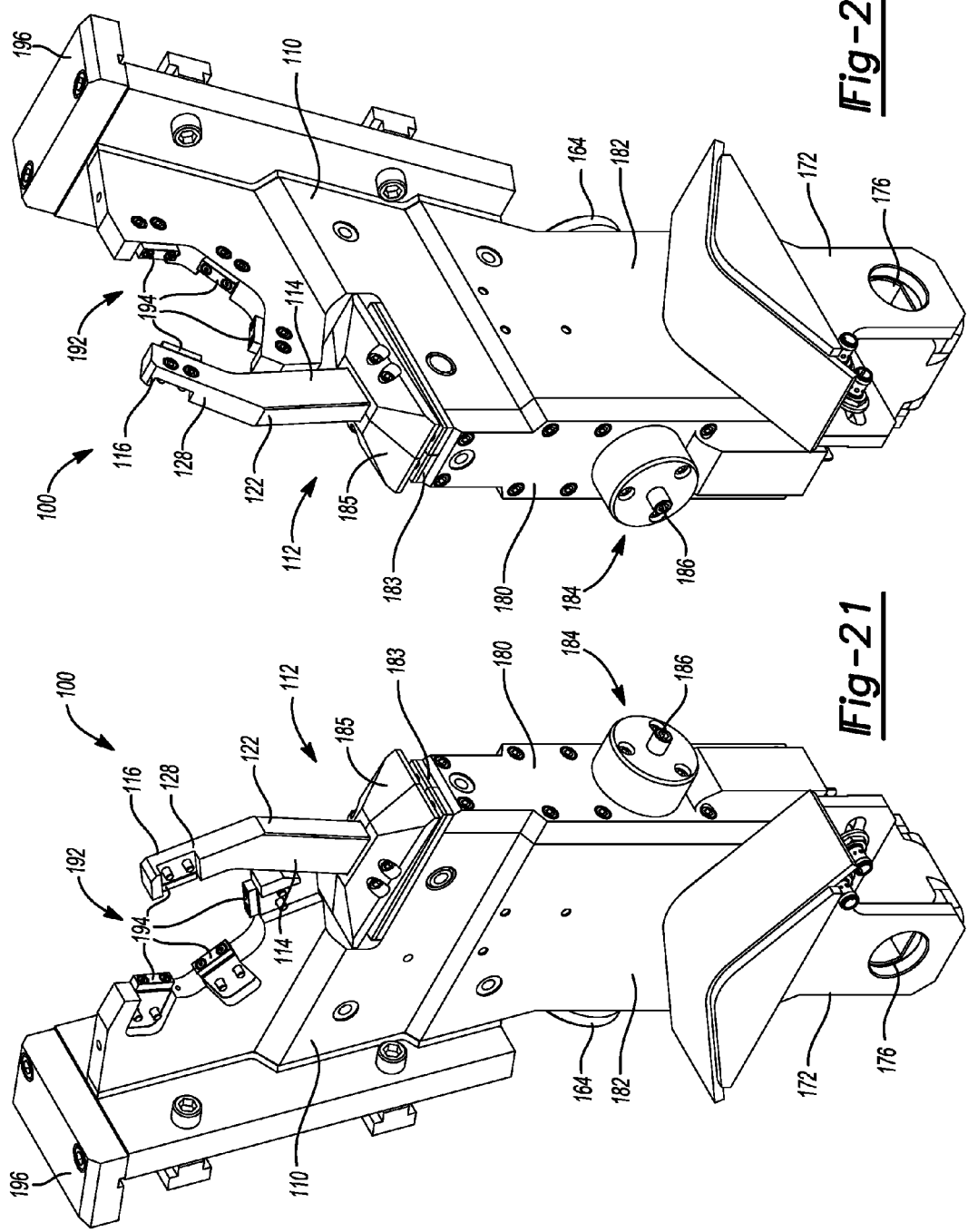

Program Iterates Through all Drill Site Locations

Constraint ;
Base on an Offset from Imbalance Vector Z $$\min \sum_{i=1}^{N} |V_i| \cos(\Theta_{vi}) \leq Q_{1x}$$

Solver Seeks Minimum V

Drill Site Angle from Workpiece

CRANKSHAFT BALANCER MACHINE

FIELD

The present disclosure relates to a crankshaft balancer machine and, more particularly, relates to a crankshaft balancer machine having an advantageous construction.

BACKGROUND AND SUMMARY

This section provides background information related to the present disclosure which is not necessarily prior art. This section provides a general summary of the disclosure, and is not a comprehensive disclosure of its full scope or all of its features.

It is common practice in automotive manufacturing settings to employ a crankshaft assembly system to assembly and/or balance a crankshaft for an engine. Generally, these crankshaft assembly systems include a pedestal support having a retractable arm to releasably retain a crankshaft on the pedestal support during processing. Such processing of the crankshaft can include drilling, shaving, mounting, tapping, and the like. Moreover, the processing of the crankshaft can be part of a balancing system for balancing the rotational mass of the crankshaft assembly.

According to the principles of the present teachings, a crankshaft balancer machine for balancing crankshafts is provided having advantageous constructions and method of operation. The crankshaft balancer machine includes a measurement station configured to rotate the crankshaft to obtain vibration-related data, a transfer station configured to transfer the crankshaft between the measurement station and the correction station, and a correction station configured to drill at least a portion of the crankshaft to correct an imbalance in response to the imbalance data. The measurement station includes a base structure, a measurement bridge support, a plurality of flexural support legs extending therebetween, at least one sensor, and a drive system to spin the crankshaft and output imbalance data. The transfer station includes at least one lifting arm selectively engaging the crankshaft and supporting the crankshaft during transfer. The correction station includes a drilling device horizontally disposed to achieve a horizontal drill direction into the crankshaft to correct any imbalance according to a customized software protocol.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 14 is a cross-sectional view of a portion of the measurement station according to the principles of the present teachings;

FIG. 15 is a cross-sectional view of a portion of the measurement station taken along line 15-15 of FIG. 9 according to the principles of the present teachings;

FIG. 21 is a first perspective view of a pneumatic crankshaft clamp assembly according to the principles of the present teachings;

FIG. 22 is a second perspective view of the pneumatic crankshaft clamp assembly according to the principles of the present teachings;

Corresponding reference numerals indicate corresponding parts throughout the several views of the drawings.

DETAILED DESCRIPTION

Figure 1:
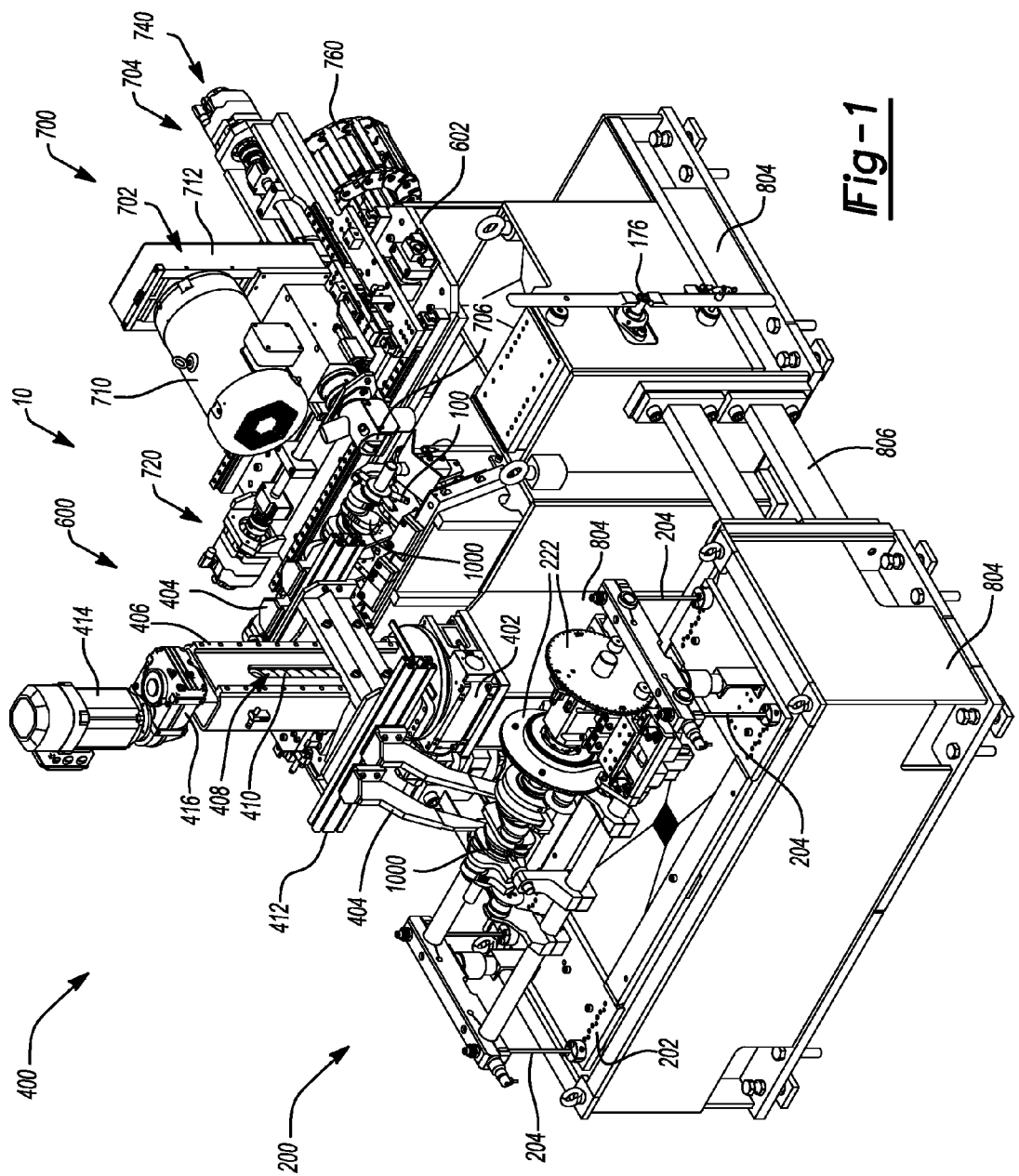
FIG. 1 is a front left perspective view of a crankshaft balancer and suspension system assembly according to the principles of the present teachings.
Figure 2:
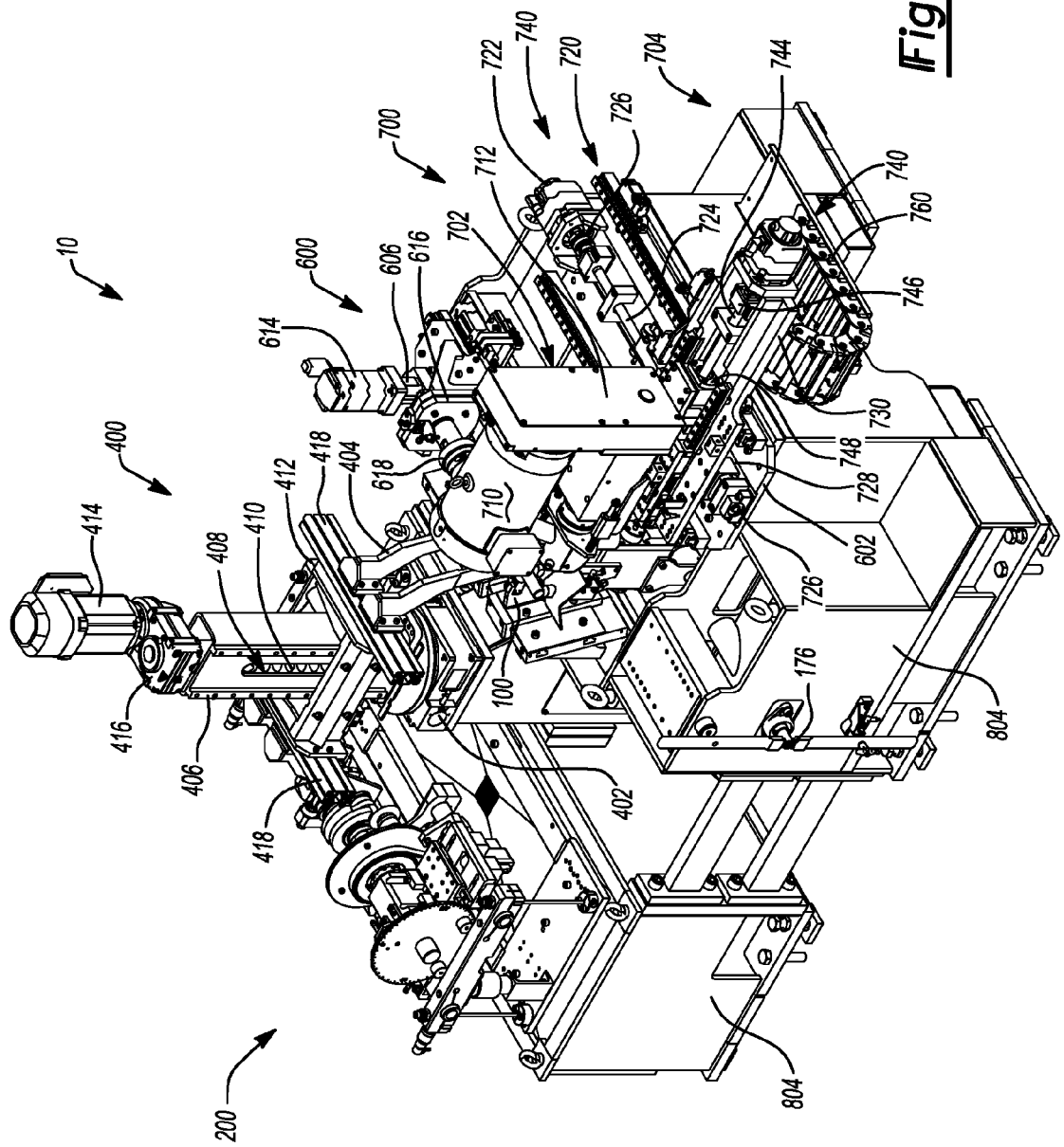
FIG. 2 is a rear right perspective view of the crankshaft balancer and suspension system assembly according to the principles of the present teachings.
Figure 3:
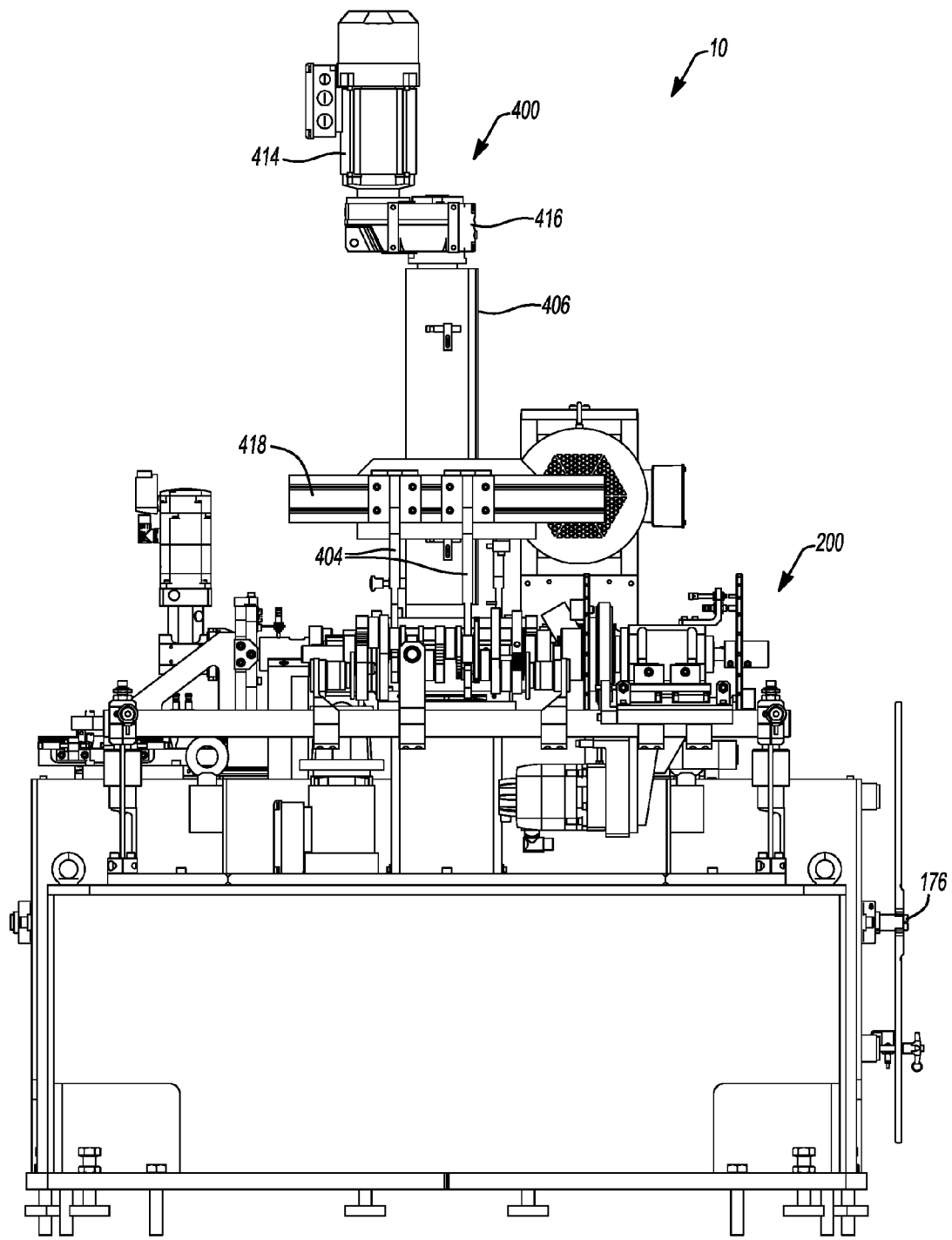
FIG. 3 is a front view of the crankshaft balancer and suspension system assembly according to the principles of the present teachings.
Figure 4:
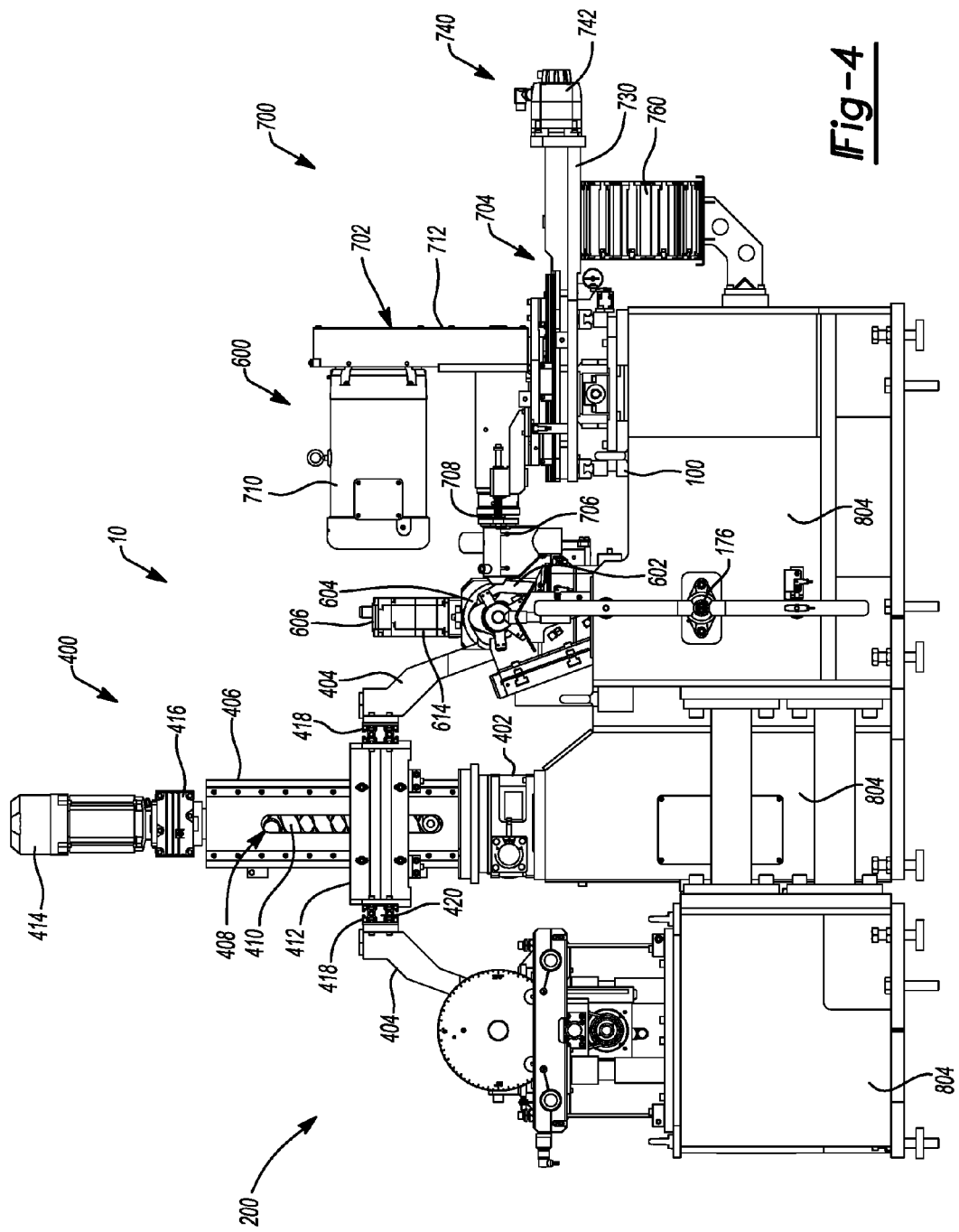
FIG. 4 is a right side view of the crankshaft balancer and suspension system assembly according to the principles of the present teachings.
Figure 5:
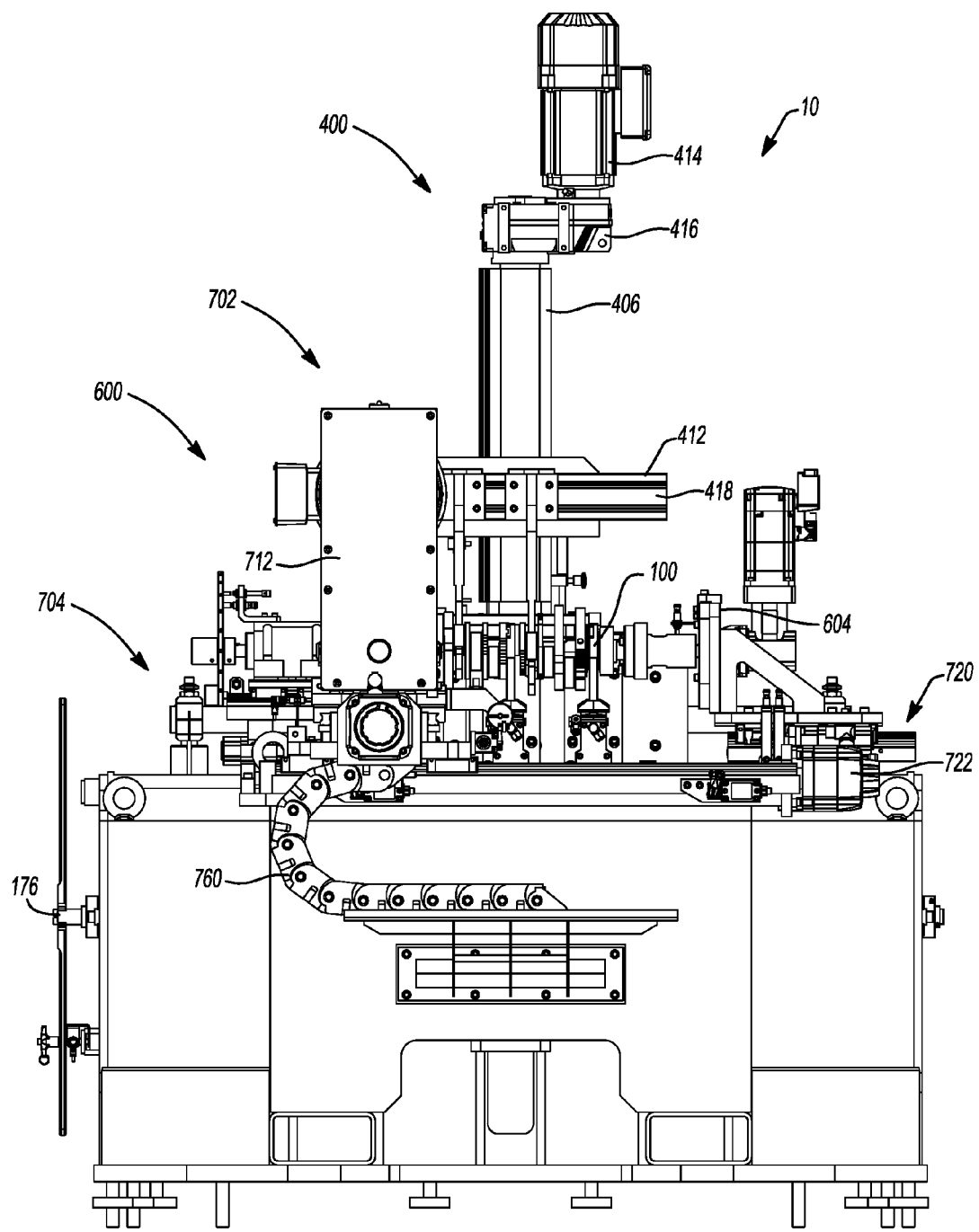
FIG. 5 is a rear view of the crankshaft balancer and suspension system assembly according to the principles of the present teachings.
Figure 6:
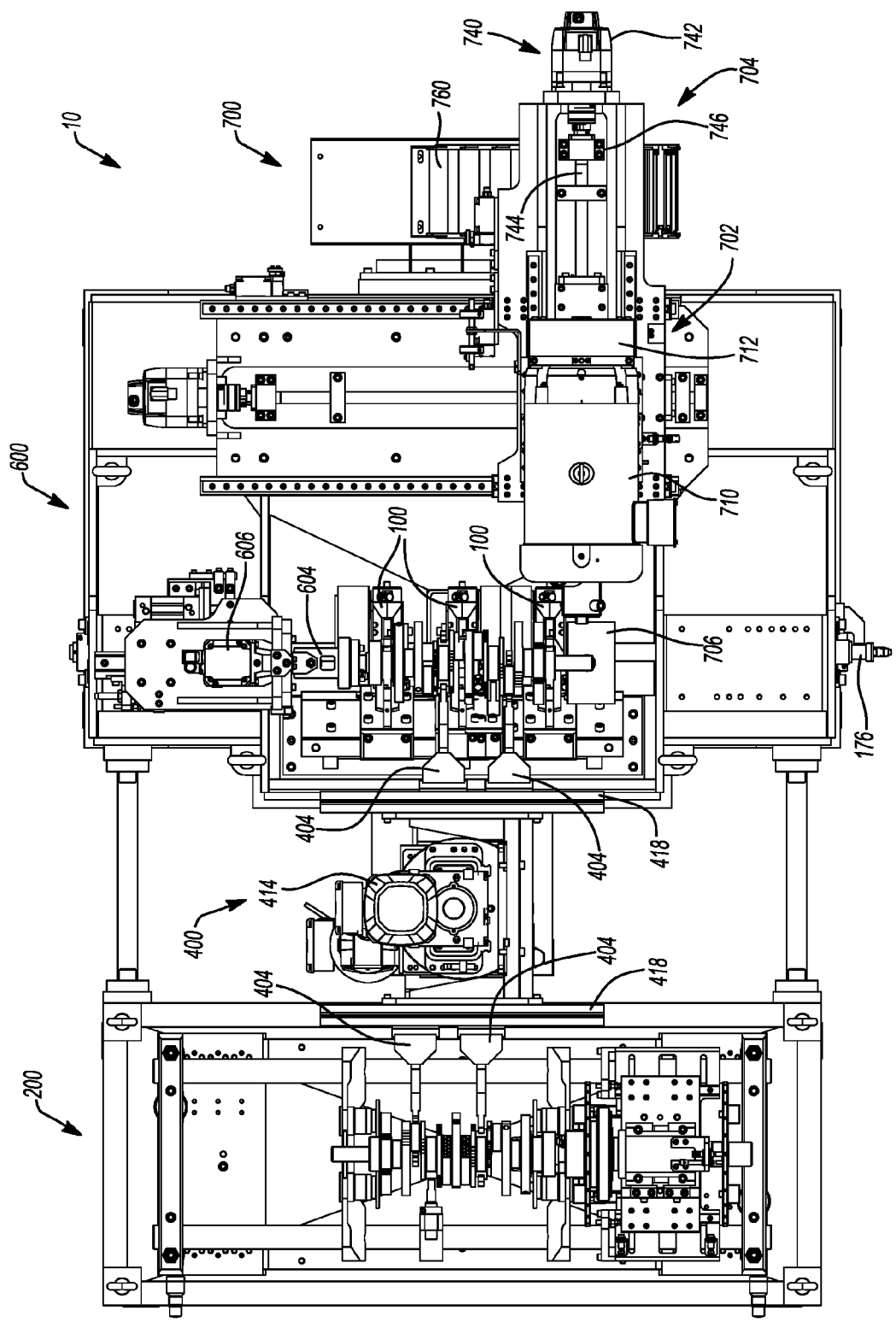
FIG. 6 is a top view of the crankshaft balancer and suspension system assembly according to the principles of the present teachings.
Figure 7:
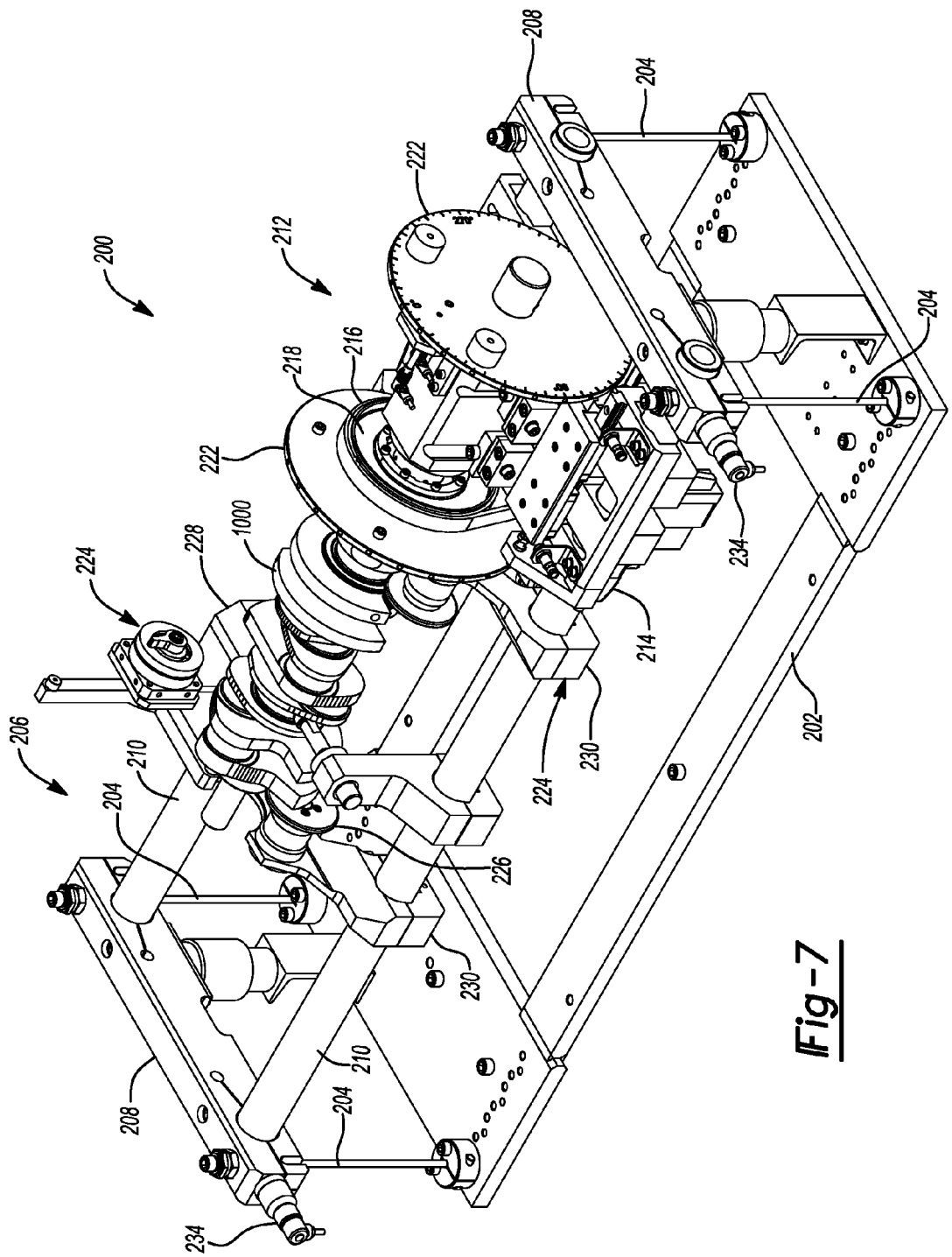
FIG. 7 is a perspective view of a measurement station according to the principles of the present teachings.
Figure 8:
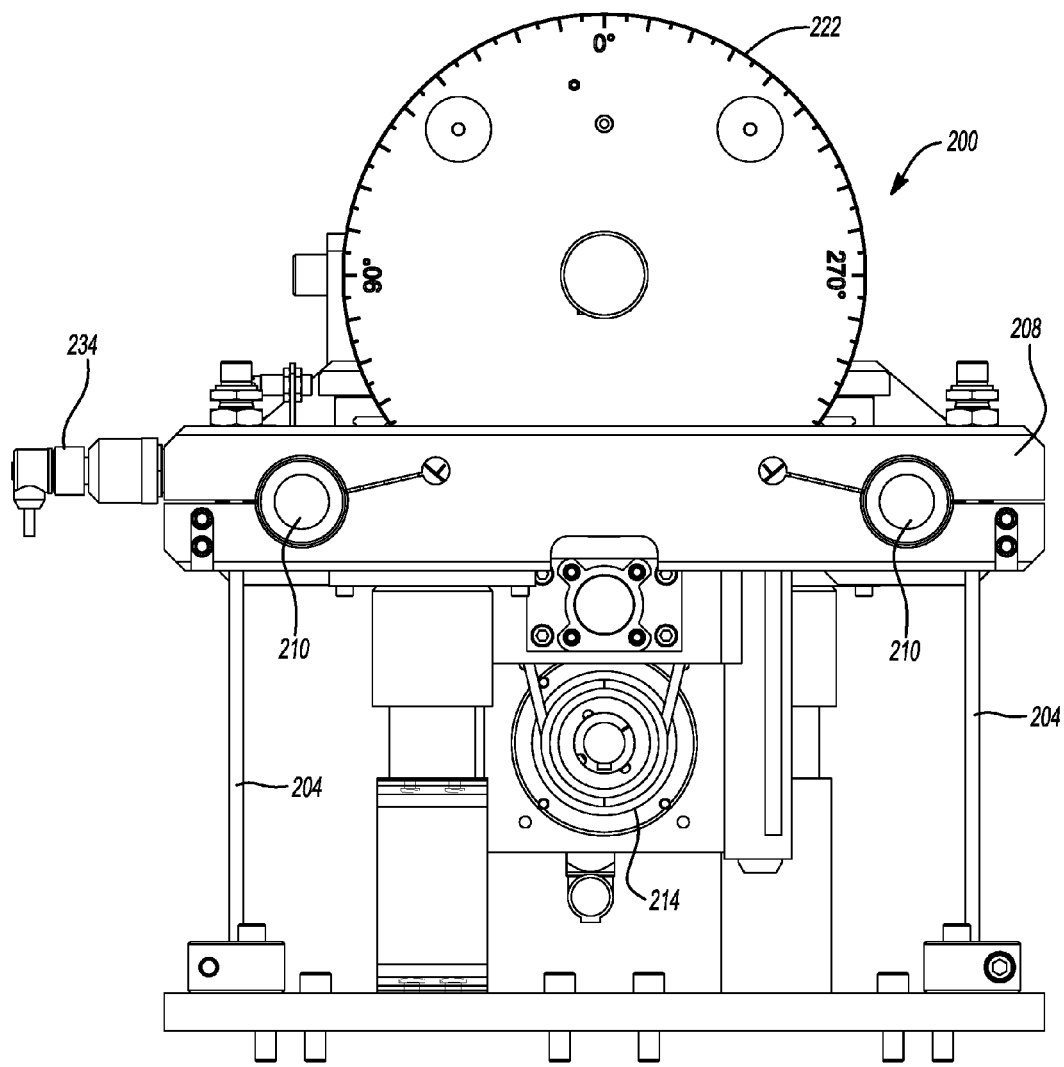
FIG. 8 is a right view of the measurement station according to the principles of the present teachings.
Figure 9:
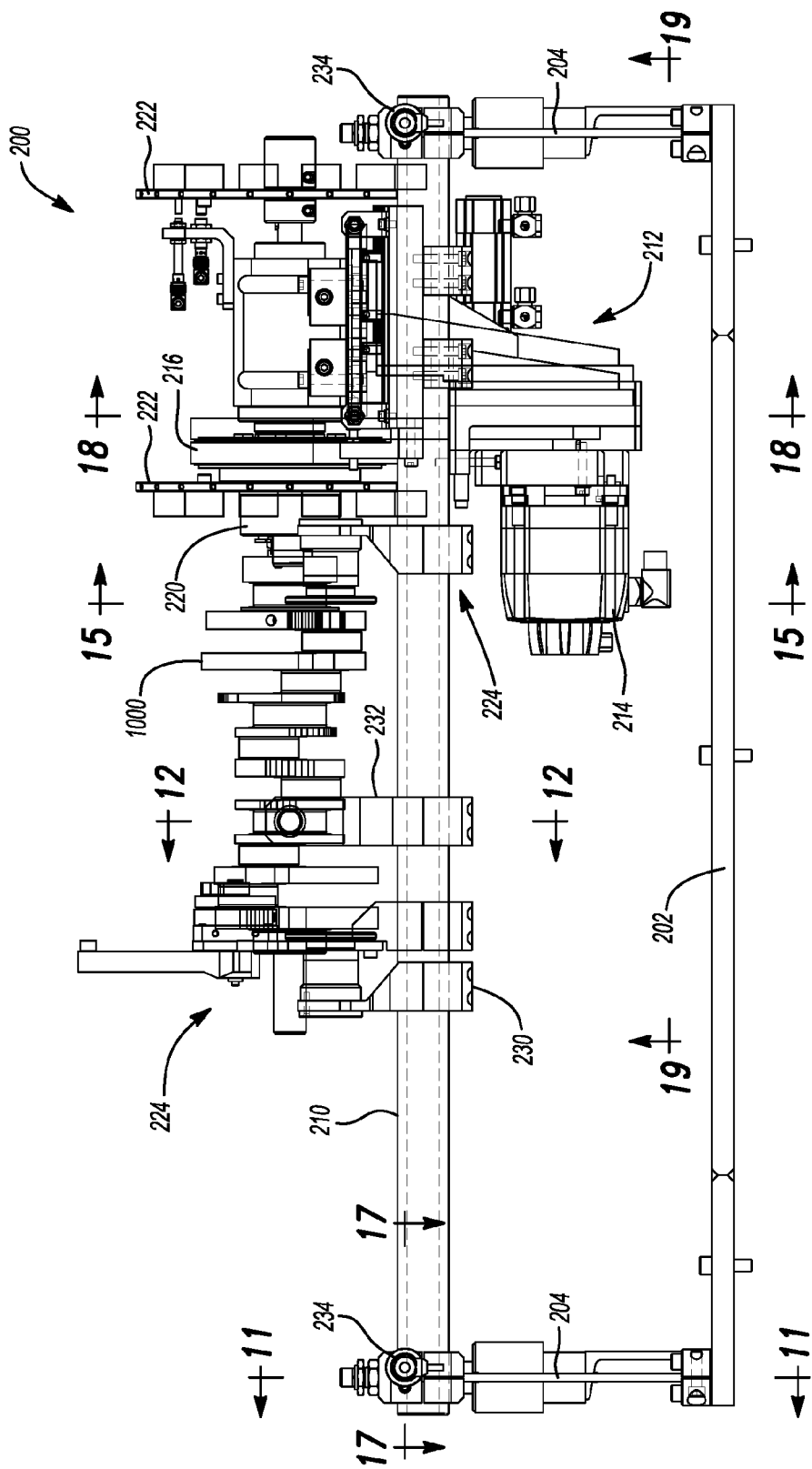
FIG. 9 is a front view of the measurement station according to the principles of the present teachings.
Figure 10:
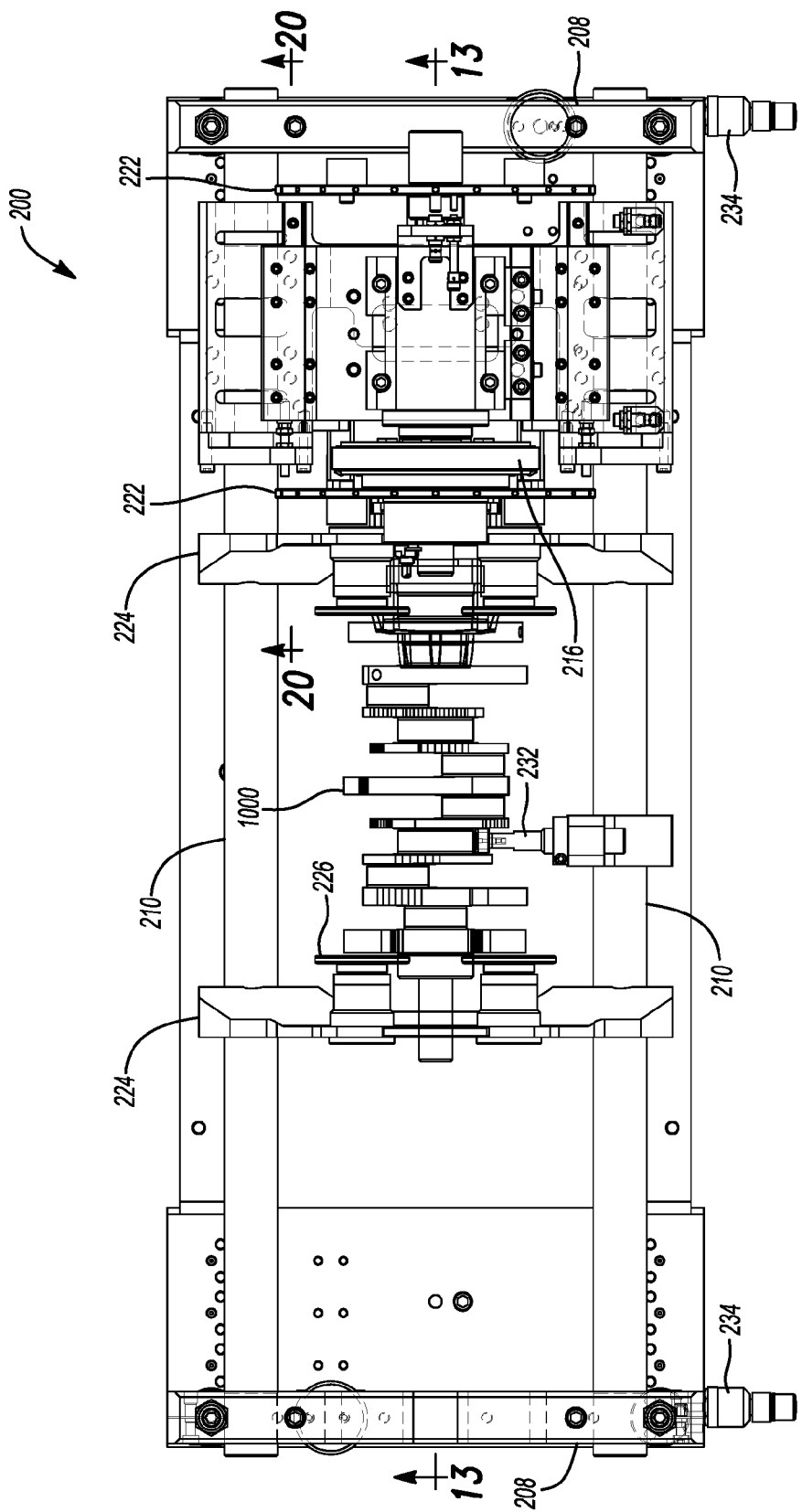
FIG. 10 is a top view of the measurement station according to the principles of the present teachings.
Figure 11:
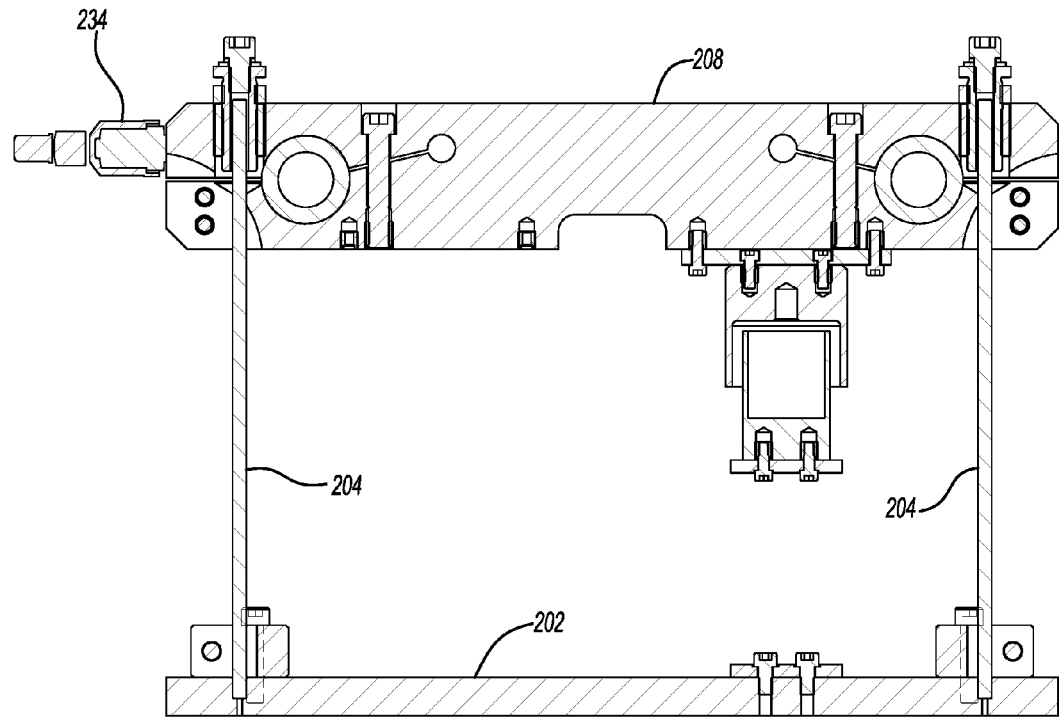
FIG. 11 is a cross-sectional view of a portion of the measurement station taken along line 11-11 of FIG. 9 according to the principles of the present teachings.
Figure 12:
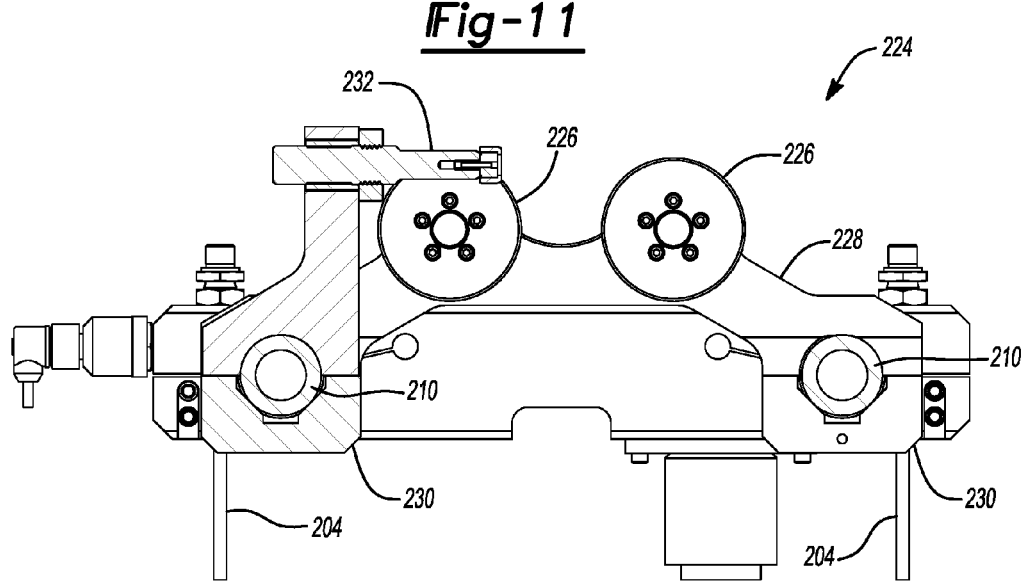
FIG. 12 is a cross-sectional view of a portion of the measurement station taken along line 12-12 of FIG. 9 according to the principles of the present teachings.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer, or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

According to the principles of the present teachings, a crankshaft balancer and suspension system assembly 10 is illustrated having advantageous construction and method of operation. It should be understood that the specific orientation and configuration of many of the components and systems of crankshaft balancer and suspension system assembly 10 can vary unless otherwise claimed herein. Therefore, the following disclosure should be regarded as providing some embodiments of the present invention.

With particular reference to FIGS. 1-6, in some embodiments, crankshaft balancer and suspension system assembly 10 can comprise a plurality of substations each tailored to manipulate, test, and/or process a crankshaft 1000 of an engine during manufacturing. To this end, crankshaft balancer and suspension system assembly 10 can generally comprises one or more of a plurality of stations, such as, but not limited to, a measurement station 200, a transfer station 400, and a correction station 600. In some embodiments, the major components of crankshaft balancer and suspension system assembly 10 can comprise a guard structure 802 (not shown) enclosing the stations for safety, noise, and/or operational considerations. Moreover, in some embodiments, measurement station 200, a transfer station 400, and a correction station 600, and their associated subcomponents and structure, can be positioned upon elevated structures 804. Each of the elevated structures 804 is configured and sized to raise the associated station above a floor level for viewing, operation, maintenance, and processing purposes, as desired. It should be understood that structures 804 can be independently formed, integrally formed, and/or operably coupled, such as via supports 806, as desired.

Measurement System

Generally, as illustrated in FIGS. 7-20, measurement station 200 is configured to rotate crankshaft 1000 to obtain data relevant to determining a rotational balance of crankshaft 1000. To this end, measurement station 200 can comprise a system operable to spin crankshaft 1000 about the longitudinal axis of crankshaft 1000. During such spinning of crankshaft 1000, an out-of-balance vibration may be present that results in a vibration in measurement station 200 sufficient to be measured by electronic means, thereby outputting vibration-related data. In some embodiments, this vibration-related data is used to determine a crankshaft processing protocol (e.g. determination of crankshaft production properties in connection with specification limits and the like). In some embodiments, the crankshaft processing protocol can define treatment and/or modification requirements to modify crankshaft 1000 such that the resultant rotational balance of crankshaft 1000 is within the specification limits. To this end, crankshaft processing protocol can call for removal and/or addition of material from counterweights installed on crankshaft 1000 at correction station 600. Crankshaft 1000 can be moved from measurement station 200 to correction station 600 via transfer station 400, as will be discussed herein.

In some embodiments, measurement station 200 comprises a base structure 202 connectable to elevated structure 804. Base structure 202 can be substantially planar for supporting the remaining components of measurement station 200 thereon. In some embodiments, base structure 202 is operably coupled to a plurality of vertically extending flexural support legs 204 disposed at opposing corners of base structure 202. In some embodiments, flexural support legs 204 are generally cylindrical in shape and sized to permit a vibration to operably occur in a measurement bridge structure 206 operably coupled to each of the plurality of flexural support legs 204. In this way, vibrations produced within measurement bridge structure 206 can be detected, measured, and output as data relevant to determining the rotational balance of crankshaft 1000. In some embodiments, measurement bridge structure 206 can comprise a pair of end bracket supports 208 each being coupled to a pair of the plurality of flexural support legs 204, such as through clamping connection. Each of the end bracket supports 208 can comprise clamping or fastening structure for receiving and securing opposing, parallel support tubes 210. In some embodiments, support tubes 210 are each generally cylindrical in shape and sized to support the weight of the remaining componentry and crankshaft 1000 during operation. In some embodiments, support tubes 210 can be parallel to each other and generally orthogonal to end bracket supports 208. In some embodiments, end bracket supports 208 and support tubes 210 together define a generally rigid frame for supporting a drive system 212 and crankshaft 1000 upon the plurality of flexural support legs 204.

In some embodiments, drive system 212 can comprise a motor 214, such as a servo motor, operably coupled to a coupling system 216, such as a belt, via a sprocket 218 operably coupled to a drive spindle 220. Drive spindle 220 is connectable to crankshaft 1000 to rotate crankshaft 1000 in a direction about the longitudinal axis of crankshaft 1000 during testing and measurement. In some embodiments, drive system 212 can comprise one or more compensating plates 222. Compensating plates 222 can be used to compensate for final weights and/or conditions that will be later applied to crankshaft 1000 that are not currently present and/or compensating plates 222 can be used to compensate for the weight of crankshaft 1000 during testing.

As will be appreciated from the figures, in some embodiments, coupling system 216 of drive system 212 is coupled generally adjacent to drive spindle 220. This proximal arrangement (rather than at an end of the assembly) positions the motor 214 closer to the center of gravity the system 200, thereby minimizing and/or eliminating the parasitic mass of the system.

In some embodiments, measurement station 200 can comprise a roller bridge assembly 224 operably coupled to one or more support tubes 210 of measurement bridge structure 206 for rotatably supporting crankshaft 1000 during testing and measurement. Roller bridge assembly 224 can comprise one or more rollers 226 rotatably mounted on a bridge support 228 that is clamp to one or more support tubes 210 via clamps 230.

Similarly, in some embodiments, measurement station 200 can comprise one or more thrust locators 232 operably coupled to one or more support tubes 210 of measurement bridge structure 206 for ensuring proper location of crankshaft 1000 upon measurement station 200 during testing and measurement.

Still further, in some embodiments, measurement station 200 can comprise one or more vibration sensors 234 operably coupled to at least a portion of measurement bridge structure 206 for detecting and measuring vibration force produced during rotation of crankshaft 1000. As has been discussed herein, this vibration force may be indicative of an out-of-balance condition in crankshaft 1000 relative to a predefined vibration limit. In some embodiments, this vibration force can be measured by one or more sensors 234, such as an accelerometer, two-axis accelerometer, three-axis accelerometer, velocity sensors, proximity sensors, magnetic sensors, and the like. Vibration sensors 234 can output data relevant to determining a rotational balance of crankshaft 1000. As discussed herein, this vibration data can be is used to determine a crankshaft processing protocol (e.g. determination of crankshaft production properties in connection with specification limits and the like). In some embodiments, the crankshaft processing protocol can define treatment and/or modification requirements to modify crankshaft 1000 such that the resultant rotational balance of crankshaft 1000 is within the specification limits. To this end, crankshaft processing protocol can call for removal and/or addition of material from counterweights installed on crankshaft 1000 at correction station 600.

Transfer Station

As illustrated in FIGS. 1-6, in order to process crankshaft 1000 after determination of vibration data and the resultant processing protocol, crankshaft 1000 can be transferred from measurement station 200 to correction station 600 using transfer station 400. To this end, in some embodiments as illustrated in FIGS. 1-6, transfer station 400 can comprise a rotatable transfer table 402 supported upon a structure, such as elevated structure 804, and positioned between measurement station 200 and correction station 600. Rotatable transfer table 402 is configured to permit rotation about a vertical axis of a plurality of lifting arms 404 sized and configured to support crankshaft 1000, as will be described. In some embodiments, rotatable transfer table 402 is power-driven rotation table capable of rotating a first pair of lifting arms 404, which support a first crankshaft 1000, about the vertical axis from measurement station 200 to correction station 600. Likewise and, in some embodiments, simultaneously, a second pair of lifting arms 404, which support a second crankshaft 1000, can be rotated about the vertical axis from correction station 600 back to measurement station 200 for testing following balance correction and/or to a load/offload station (not shown) for loading new crankshafts for measurement and correction and offloading corrected crankshafts.

In some embodiments, transfer station 400 further comprises a tower portion 406 operably coupled and supported by rotatable transfer table 402 to permit rotation of tower portion 406 about the vertical axis. Tower portion 406 can comprise a cam/ball screw system 408 having an internal cam follower 410 operably coupled to lift bridge 412 via a camming interface. Internal cam follower 410 can be being rotatably driven to lift and/or lower lift bridge 412. Lift bridge 412 can be operably coupled to the plurality of lifting arms 404, thereby permitting transfer station 400, via tower portion 406, cam follower 410, and the plurality of lifting arms 404, to lift and/or lower crankshaft 1000 into position on measurement station 200 and correction station 600. In some embodiments, internal cam/ball screw system 408 is driven by a cam motor 414 via a cam transmission 416.

It should be understood that lift bridge 412 can comprise a pair of channel support members 418 defining channel or other features 420 sized and shaped to receive complementary features formed on lifting arms 404. In this regard, lifting arms 404 can be quickly and conveniently installed and/or repositioned along channel support members 418 to accommodate size and shape variations of crankshaft 1000.

Correction Station

With reference to FIGS. 1-6, to permit vibration correction of crankshaft 1000, correction station 600 is provided to receive, retain, and horizontally drill crankshaft 1000 to remove material at custom locations according to vibration data received from measurement station 200 and computed by a central processing unit. Each crankshaft 1000 can be corrected at correction station 600 based on a custom processing protocol determined in connection with data representative of the present crankshaft 1000.

In some embodiments, correction station 600 is configured to support, rotate, and retain crankshaft 1000 to permit correction processing (e.g. rotational balancing) of crankshaft 1000. To this end, correction station 600 can comprise a system operable to spin crankshaft 1000 about the longitudinal axis of crankshaft 1000 to position crankshaft 1000 in a predetermined orientation to permit horizontal drilling of portions thereof.

In some embodiments, correction station 600 comprises a base structure 602 connectable to elevated structure 804. Base structure 602 can be substantially planar for supporting the remaining components of correction station 600 thereon. In some embodiments, base structure 602 is operably coupled to a correction bridge structure 604 for supporting crankshaft 1000 during processing. In some embodiments, correction bridge structure 604 can comprise a drive system 606 driving crankshaft 1000 to position crankshaft 1000 into various positions during drilling and processing.

In some embodiments, drive system 606 can comprise a motor 614, such as a servo motor, operably coupled to a coupling system 616, such as a belt, operably coupled to a drive spindle 618. Drive spindle 618 is connectable to crankshaft 1000 to rotate crankshaft 1000 in a direction about the longitudinal axis of crankshaft 1000 during drilling and processing. In order to hold and retain crankshaft during drilling and processing, and accommodate the enormous forces exerted on crankshaft 1000, correction station 600 can comprise one or more pneumatic crankshaft clamp assemblies 100.

Pneumatic Crankshaft Clamp Assembly

As illustrated in FIGS. 21-29, pneumatic crankshaft clamp assembly 100 is provided having an advantageous construction and method of operation. In some embodiments, pneumatic crankshaft clamp assembly 100 can comprise a housing 110 and a clamp mechanism 112. Clamp mechanism 112 can be configured to be pneumatically actuated between a clamp position and an unclamp position. To this end, in some embodiments, clamp mechanism 112 can comprise a clamp arm 114 having a distal end 116 and a proximal end 118. Clamp arm 114 can be pivotally coupled to housing 110 at a clamp pivot 120 to move between the clamp position and the unclamp position, as will be described herein.

In some embodiments, clamp arm 114 includes an elongated grasping portion 122 extending from an enlarged central hub portion 124. Central hub portion 124 generally surrounds and contains clamp pivot 120. In some embodiments, a bearing or other member 126 can be disposed between central hub portion 124 and clamp pivot 120 to facilitate reduce friction operation and improved durability. Elongated grasping portion 122 can be shaped to include an angled distal portion 128 to facilitate grasping a crankshaft 1000 (FIG. 26) for processing. As will be described herein, one or more spacers can be disposed at or along elongated grasping portion 122 to engage crankshaft 1000 during processing. In some embodiments, clamp arm 114 includes an elongated cam portion 130. In some embodiments, elongated cam portion 130 can be positioned to opposingly extend from central hub portion 124 oppose of elongated grasping portion 122. Elongated cam portion 130 can terminate at a cam end 132 having a cam follower member 134 operably coupled thereto. Cam follower member 134 can comprise a circular member, or other shaped member, that is configured to cammingly follow a cam 136 formed on a piston member 138. In some embodiments, cam follower member 134 comprises a bearing member.

Figure 25:
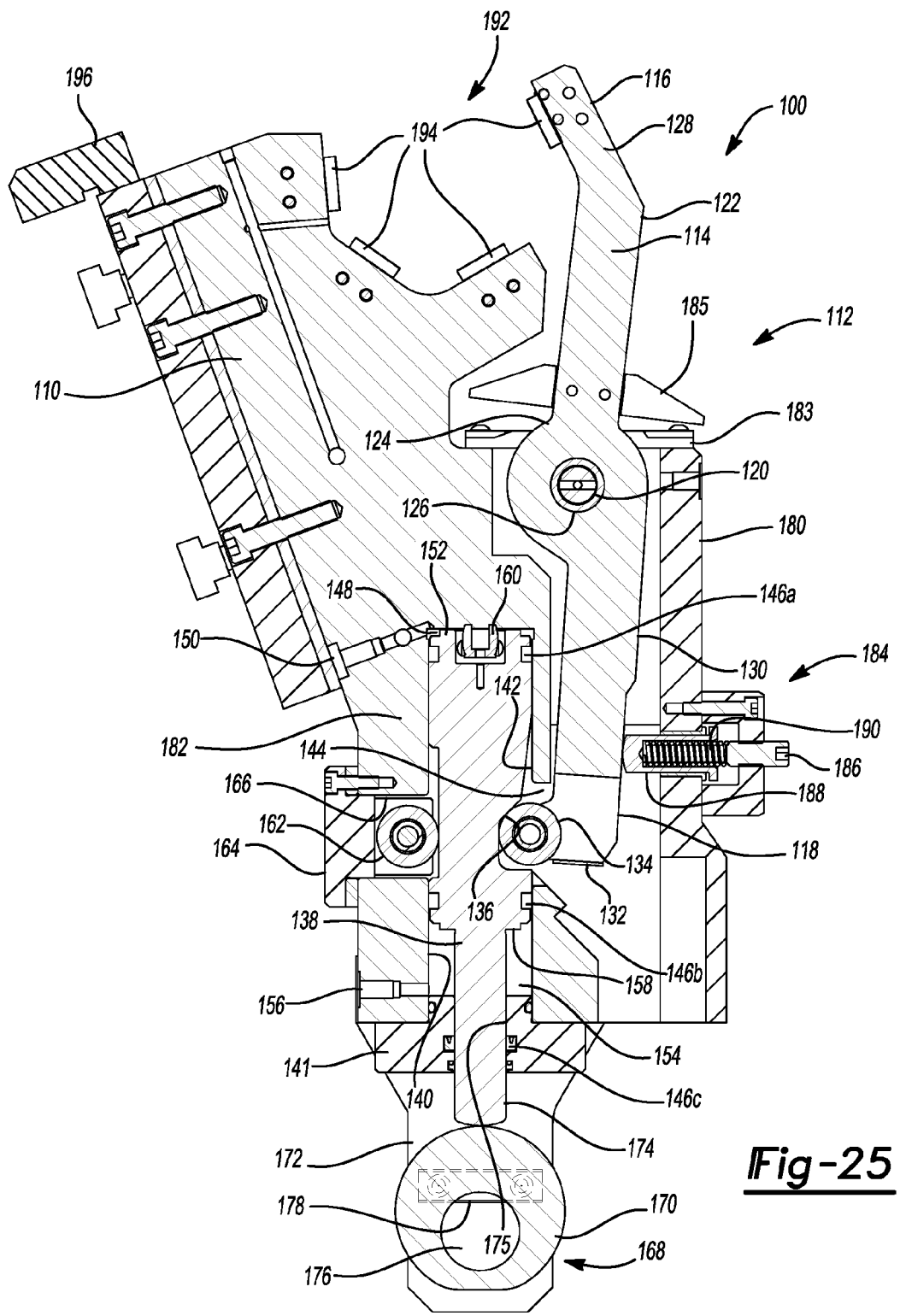
FIG. 25 is a cross-sectional view of the pneumatic crankshaft clamp assembly taken along line 25-25 of FIG. 23 according to the principles of the present teachings.
Figure 26:
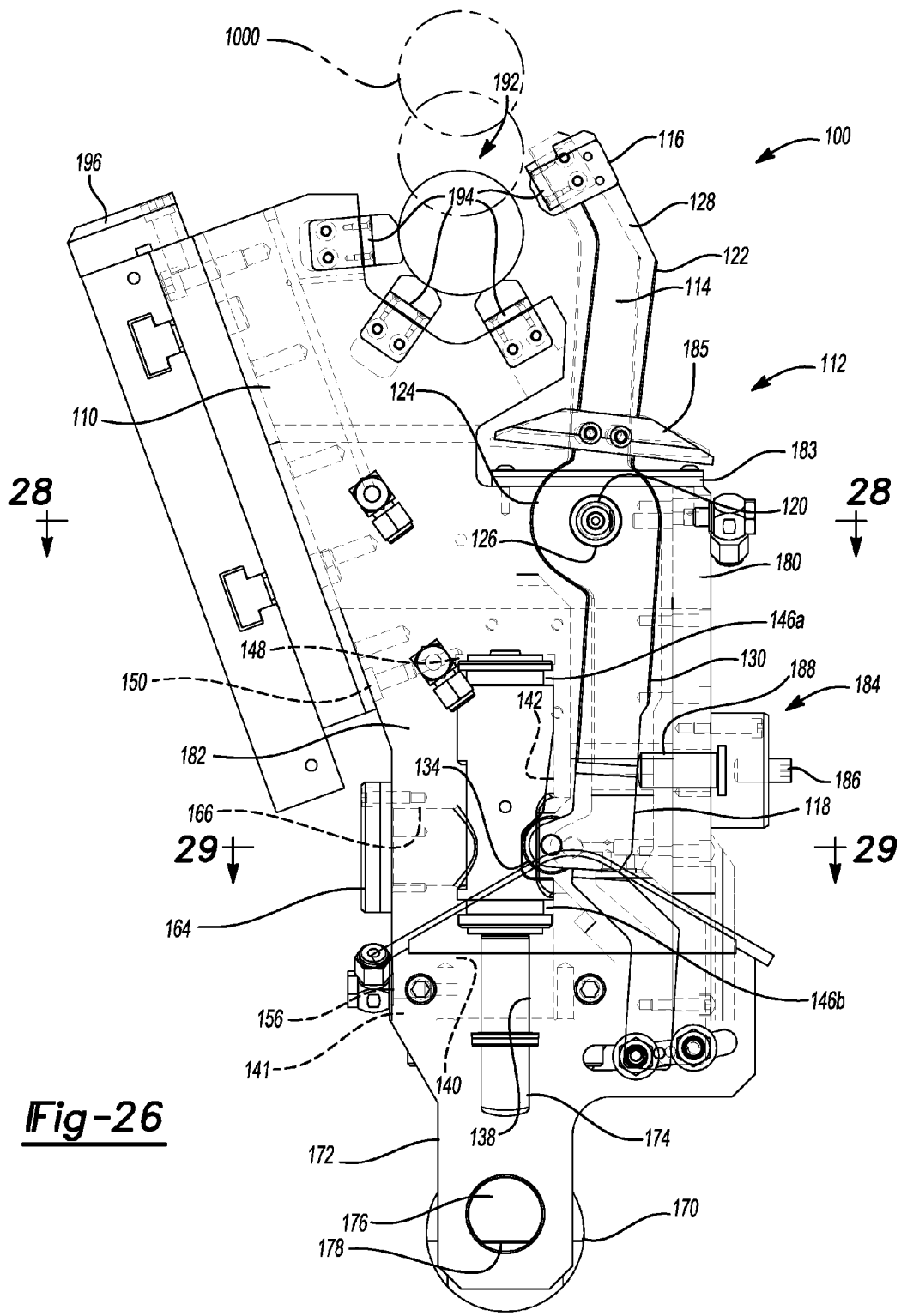
FIG. 26 is a composite front view of the pneumatic crankshaft clamp in an unclamp position assembly according to the principles of the present teachings.
Figure 27:
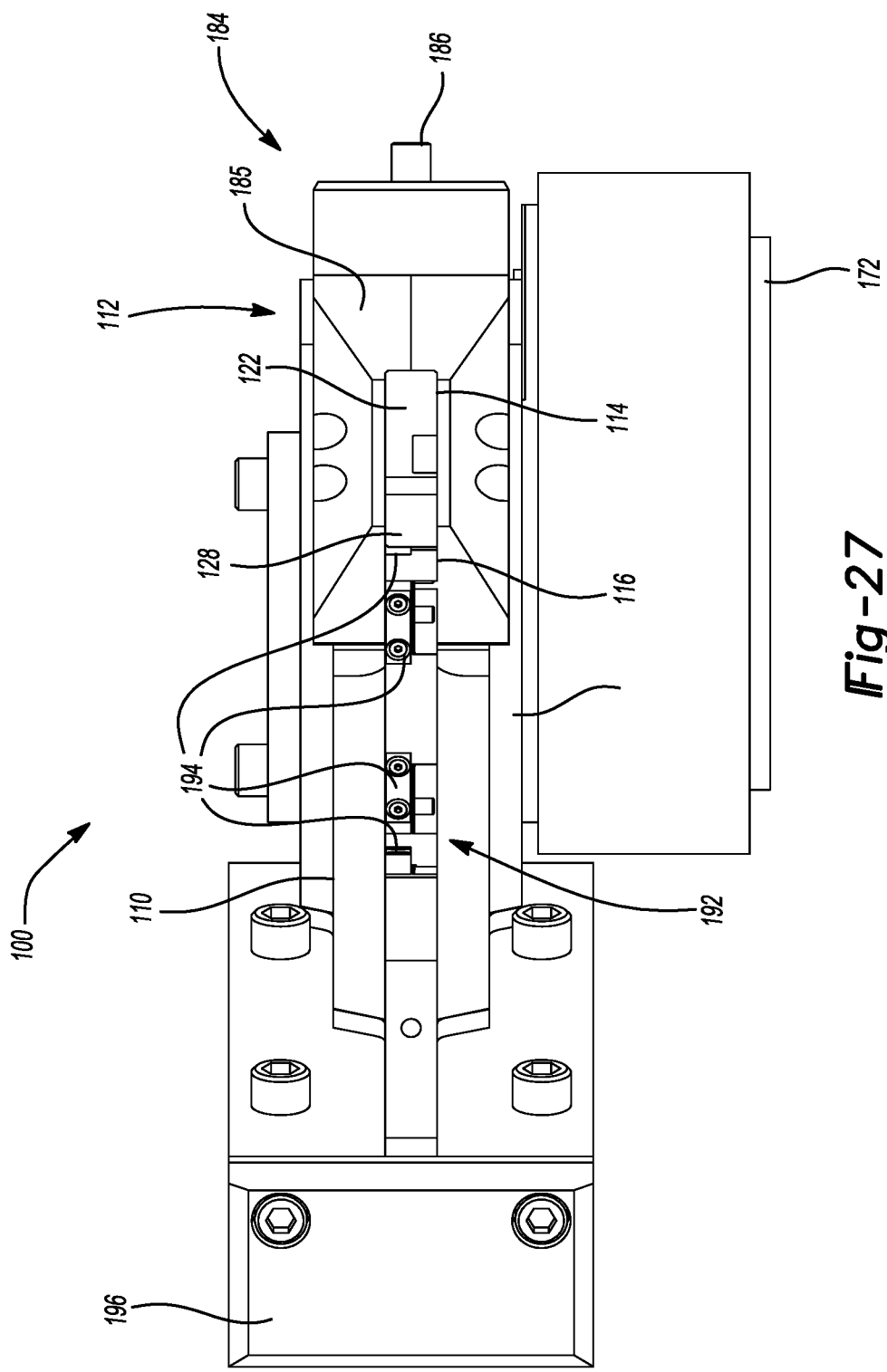
FIG. 27 is a top view of the pneumatic crankshaft clamp assembly according to the principles of the present teachings.
Figure 28:
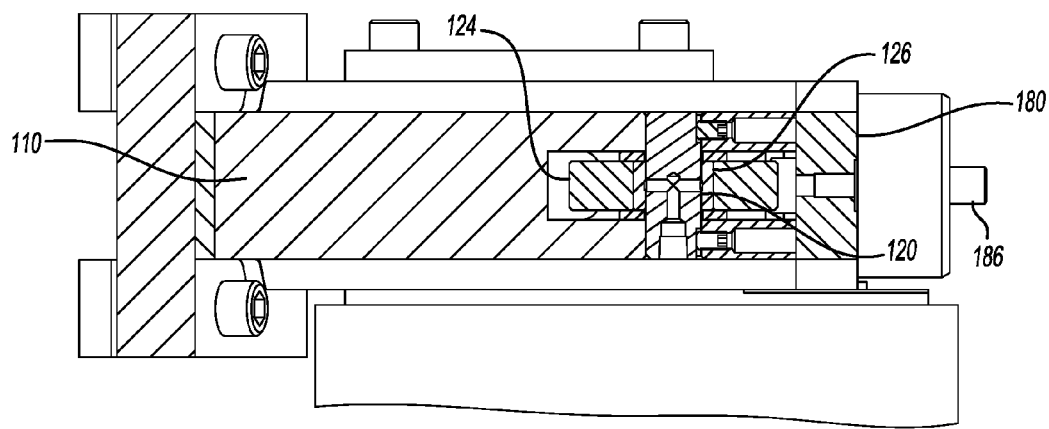
FIG. 28 is a cross-sectional view of the pneumatic crankshaft clamp assembly taken along line 28-28 of FIG. 26 according to the principles of the present teachings.
Figure 29:
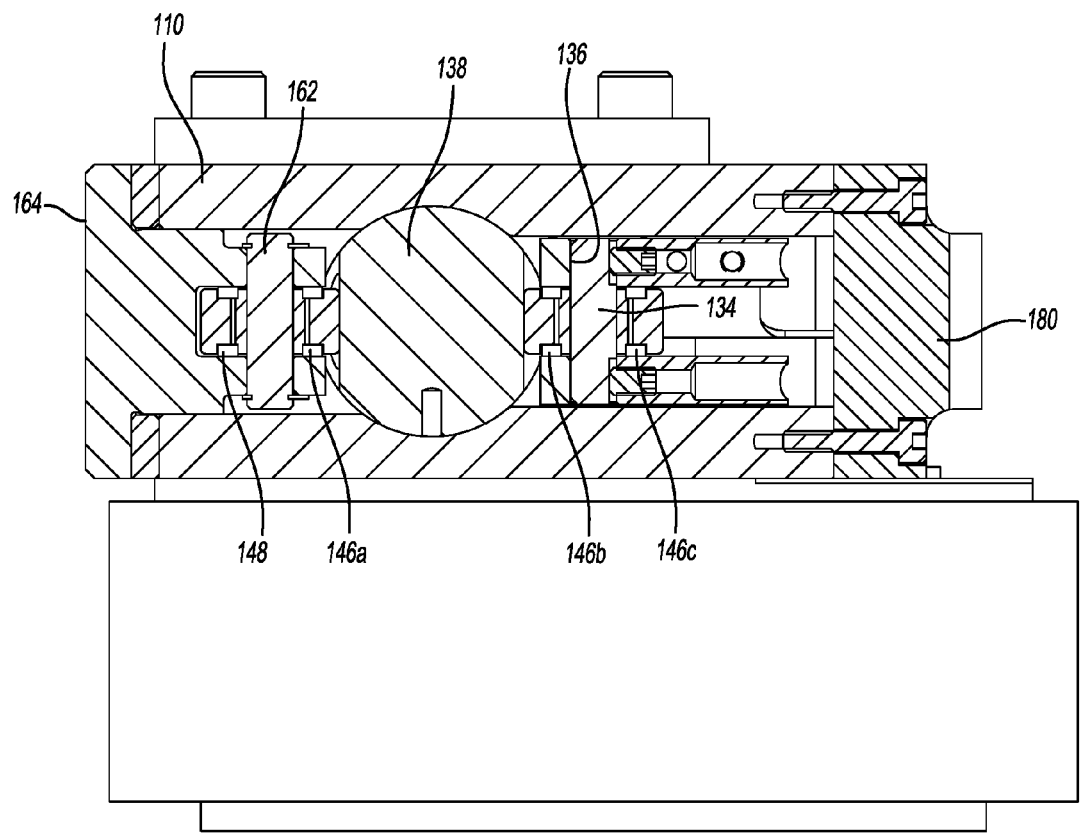
FIG. 29 is a cross-sectional view of the pneumatic crankshaft clamp assembly taken along line 29-29 of FIG. 26 according to the principles of the present teachings.

With particular reference to FIG. 25, in some embodiments, piston member 138 is slidably disposed within a piston cylinder 140 formed in housing 110. In some embodiments, piston cylinder 140 is generally cylindrical in shape and sized to closely conform to piston member 138 for sliding movement therein in response to pneumatic actuation. A cap member 141 can be used to enclose piston cylinder 140 can contain piston member 138 therein. Cap member 141 can be coupled to housing 110 using any conventional members. In some embodiments, a seal member is disposed between cap member 141 and housing 110 to maintain a pneumatic seal. A sidewall section 142 of piston cylinder 140 is removed to form a slot or opening 144 to permit cam follower member 134 to extend therethrough and contact cam 136 formed on piston member 138 for camming operation therewith. Piston member 138 is configured to slide within piston cylinder 140 between a clamp position (down in FIG. 25) and an unclamp position (up in FIG. 25).

With continued reference to FIG. 25, piston member 138 can comprise one or more slots 146 formed about the sidewall thereof to receive seal members. The seal members are operable to define a first pressurizable chamber 148 extending between a top surface 150 of piston cylinder 140 and a first slot 146a of piston member 138. As will be described herein, the first pressurizable chamber 148 will be pressurized in response to introduction of pneumatic pressure from clamp inlet port 150. Clamp inlet port 150 extends through housing 110 and is fluidly coupled to first pressurizable chamber 148 such that the pneumatic pressure exerts a pressure upon a top surface 152 of piston member 138 thereby urging piston member 138 to move downward in FIG. 25 into the clamp position. Similarly, the seal members are operable to define a second pressurizable chamber 154 extending between a second slot 146b and a third slot 146c of cap member 141. As will be described herein, the second pressurizable chamber 154 will be pressurized in response to introduction of pneumatic pressure from unclamp inlet port 156. Unclamp inlet port 156 extends through housing 110 and is fluidly coupled to second pressurizable chamber 154 such that the pneumatic pressure exerts a pressure upon a bottom surface 158 of piston member 138 thereby urging piston member 138 to move upward in FIG. 25 into the unclamp position (illustrated in FIG. 25). It should be recognized that first pressurizable chamber 148 and second pressurizable chamber 154 are located on opposing sides of piston member 138 such that a central portion of piston member 138, where cam follower member 134 is positioned is contained within an unpressurized zone between first slot 146a and second slot 146b, thereby enabling central portion of piston member 138 to be exposed to atmosphere.

In some embodiments, a bumper member 160 can be disposed at top surface 152 of piston member 138 to cushion or otherwise minimize destructive contact between piston member 138 and piston cylinder 140. Bumper member 160 can be affixed to piston member 138 via conventional means, such as a fastener or other retaining method.

With continued reference to FIG. 25, in some embodiments, pneumatic crankshaft clamp assembly 100 comprises a counter bearing member 162 generally coupled to housing 110. Counter bearing member 162, in some embodiments, can be positioned opposite of cam follower member 134 to provide an opposing force on piston member 138. In some embodiments, counter bearing member 162 rotatably mounted to a counter bearing support 164. Counter bearing support 164 and counter bearing member 162 are disposed within an opening 166 formed in housing 110. In some embodiments, the relative position of and/or opposing force exerted by counter bearing member 162 can be varied via one or more spacers or other adjustment means between counter bearing support 164 and housing 110. It should be understood that alternative adjustment techniques are anticipated.

In some embodiments, pneumatic crankshaft clamp assembly 100 comprises an override system 168. Override system 168 is configured to provide a manual override feature, such as for safety purposes, for urging piston member 138 upward into the unclamp position. To this end, an override cam member 170 is rotatably mounted along a guide bracket 172 extending from housing 110. Override cam member 170 is sized to engage a cam follower rod 174 extending from bottom surface 158 of piston member 138 and through a slot 175 formed in cap member 141. Override cam member 170 and cam follower rod 174 are sized and shaped to permit free movement of piston member 138 during normal operation; however, upon manual rotation of override cam member 170 from a first normal position to a second override position (FIG. 25), override cam member 170 contacts a distal end of cam follower rod 174 of piston member 138 and mechanically urges piston member 138 against the biasing force of pneumatic pressure within first pressurizable chamber 148. Override cam member 170 can be rotated via a handle member (not shown) disposed within an interior slot 176 and a key member 178 engaging the handle member. It should be understood that alternative manual and/or automated systems can be used for actuating override system 168.

Still further, in some embodiments, pneumatic crankshaft clamp assembly 100 comprises a cover member 180 disposed over clamp arm 114. Cover member 180, together with sidewalls 182 of housing 110 and coverplate 183 and shields 185, can contain and protect clamp arm 114 and further maintain a safe working area for an operator. In some embodiments, a biasing assembly 184 can be positioned within cover member 180 to contact elongated cam portion 130 of clamp arm 114 to exert a biasing force against clamp arm 114 to maintain engagement of cam follower 134 to cam 136. Biasing assembly 184 can comprise a set screw 186 having a distal tip urging a contact member 188 into contact with clamp arm 114. A biasing member 190, such as a spring, can urge the contact member 188 into contact as described.

Housing 110 can comprise a cradle portion 192 sized and shaped to received crankshaft 1000 therein. Cradle portion 192 can comprise one or more spacer members 194 mounted thereto for direct contact with crankshaft 1000. Spacer members 194 permit standoff spacing of crankshaft 1000 to ensure proper and exact positioning of crankshaft 1000 and improve tolerance adherence. One or more spacer members 194 can further be disposed on angled distal portion 128 of elongated grasping portion 122 to engage crankshaft 1000 during processing.

In some embodiments, pneumatic crankshaft clamp assembly 100 can be mounted for operation via a positioning block 196 extending from housing 110. Positioning block 196 can comprise any one of a number of designs sufficient to safely and reliably coupled pneumatic crankshaft clamp assembly 100 to a supporting structure for operation of pneumatic crankshaft clamp assembly 100.

During a clamping operation—from the unclamp position to the clamp position—pneumatic pressure is introduced into clamp inlet port 150 thereby increasing a pneumatic pressure within first pressurizable chamber 148. This pneumatic pressure within first pressurizable chamber 148 urges piston member 138 downward. Downward movement of piston member 138 causes cam follower member 134 to cammingly follow cam 136 formed in piston member 138 and specifically along an inclined portion of cam 136, thereby causing cam follower member 134 to be urged outwardly (arcuately to the right in FIG. 25) against the biasing force of biasing assembly 184. Counter bearing 162 opposes a force exerted on piston member 138 from cam follower member 134. This movement of cam follower member 134 is translated along cam arm 114, about pivot 120, resulting in the inward movement (arcuately to the left in FIG. 25) of angled distal portion 128 of elongated grasping portion 122 of crank arm 114 resulting in spacers 194 contacting crankshaft 1000, allowing processing of crankshaft 1000.

During an unclamping operation—from the clamp position to the unclamp position—pneumatic pressure is introduced into unclamp inlet port 156 thereby increasing a pneumatic pressure within second pressurizable chamber 154. This pneumatic pressure within second pressurizable chamber 154 urges piston member 138 upward. Upward movement of piston member 138 causes cam follower member 134 to cammingly follow cam 136 formed in piston member 138 and specifically along the declined portion of cam 136, thereby causing cam follower member 134 to be urged inwardly (arcuately to the left in FIG. 25) due to the biasing force of biasing assembly 184. Counter bearing 162 opposes a force exerted on piston member 138 from cam follower member 134. This movement of cam follower member 134 is translated along cam arm 114, about pivot 120, resulting in the outward movement (arcuately to the right in FIG. 25) of angled distal portion 128 of elongated grasping portion 122 of crank arm 114 resulting in spacers 194 being spaced apart from crankshaft 1000, allowing removal of crankshaft 1000.

During an override operation, which presumes pneumatic crankshaft clamp assembly 100 is in the clamp position, an operator or override machine can actuate override system 168 such that override cam member 170 engages cam follower rod 174 extending from bottom surface 158 of piston member 138 thereby mechanically urging piston member 138 against the biasing force of pneumatic pressure within first pressurizable chamber 148. Override cam member 170 can be rotated via a manual and/or automated system.

Drilling System

Referring to FIGS. 1-6, in some embodiments, correction station 600 comprises a drilling system 700 for drilling and removing material from crankshaft 1000 in accordance with the teachings of the present disclosure. In some embodiments, drilling system 700 comprises a drilling device 702 being supported by a positioning system 704. Positioning system 704 is configured to position drilling device 702 in various positioned relative to crankshaft 1000. In some embodiments, positioning system 704 is configured to move drilling device 702 horizontally along various longitudinal positions of crankshaft 1000. In some embodiments, positioning system 704 is configured to move drilling device 702 horizontally between an engaged drilling position (e.g. where a drill bit contacts and cuts a portion of crankshaft 1000) and a disengaged drilling position (e.g. where the drill bit is spaced apart from crankshaft 1000). In some embodiments, positioning system 704 is configured to move drilling device 702 vertically and/or angularly relative to crankshaft 1000.

In some embodiments, drilling system 702 comprises a drilling chuck 706 for retaining a conventional drilling bit (not shown) operably coupled to a drilling spindle 708. Drilling spindle 708 is coupled to a drilling motor 710 via a drilling transmission 712.

In some embodiments, drilling system 702 is configured such that drilling chuck 706 and the associated drilling bit are oriented in a horizontal position. It has been found that such horizontal drilling orientation provides a number of distinct benefits not realized by the prior art. For instance, horizontal drilling provides reduce structural sizing requirements. Conventional systems often employ an angular drilling orientation that requires enormous structure to support the drilling motor and associate systems due to gravitational forces and bending moments. However, a horizontal configuration provides a simple solution by reducing the structural requirements due to the reduced bending moments and forces. Moreover, the horizontal configuration permits a more rapid cycle time because movement of the drilling system 702 can be more quickly achieved as all linear movement results in an equal movement horizontally away from the crankshaft. Therefore, when the drilling system 702 is moved out of engagement with crankshaft 1000, a direct horizontal movement will occur more rapidly than angular movement (which includes only a reduced horizontal movement component). Therefore, the horizontal stroke of the positioning system 704 is reduced and the associated size, complexity, and cost of positioning system 704 are improved.

In some embodiments, positioning system 704 can comprise a first or longitudinal drive system 720 having a drive motor 722 operably coupled to rotationally-driven drive shaft 724. Drive shaft 724 can be supported for rotation by one or more bearing supports 726. A corresponding drive connection 728 can extend from a support platform 730 supporting drilling device 702. Support platform 730 can be generally planar having drive connection 728 mounted thereto. Actuation of longitudinal drive system 720 enables longitudinal movement of drilling device 702 relative to crankshaft 1000 for drilling at multiple longitudinal positions along crankshaft 1000. It should be understood that alternative drive systems can be used to move drilling device 702 to various longitudinal positions relative to crankshaft 1000, including belt drives, cam drives, gear drives, and the like.

Similarly, in some embodiments, positioning system 704 can comprise a second or transverse drive system 740 having a drive motor 742 operably coupled to rotationally-driven drive shaft 744. Drive shaft 744 can be supported for rotation by one or more bearing supports 746 mounted to support platform 730. A corresponding drive connection 748 can extend from drilling device 702. Actuation of transverse drive system 740 enables transverse movement of drilling device 702 relative to crankshaft 1000 and support platform 730 to drill at varying depths into crankshaft 1000. It should be understood that alternative drive systems can be used to move drilling device 702 to various transverse positions relative to crankshaft 1000, including belt drives, cam drives, gear drives, and the like.

In some embodiments, a cable guide system 760 can be provided to protect the communication and/or drive cables and other components routed to drilling device 702 and/or transverse drive system 740 to protect such communication and drive cables during movement of drilling device 702 and/or transverse drive system 740 relative to elevated structure 804.

Crankshaft Processing Protocol

Correcting for imbalances in crankshafts or other rotating members has traditionally been somewhat of a trial and error process. Although it is possible to measure the overall imbalance of a rotating member, correcting for this imbalance by adding or subtracting weight at offsetting locations can be difficult because often there may be more than one solution for where to add or subtract material. Ideally, one would like to find an optimal solution that requires minimal invasive adding or subtracting of material. However, in conventional systems finding this optimal solution has proven difficult.

In the case of crankshaft 1000, for example, there are multiple sites radially disposed along the longitudinal axis. Each of these sites can potentially be used as drill sites from which to remove weight in order to offset an imbalance. However, a machinist has only his personal judgment regarding where to drill and how deep. The goal, of course, is to remove material to counteract the measured imbalance.

This is not as easy as it might appear at first blush. Because the crankshaft has a significant longitudinal dimension, drilling to offset a static imbalance can introduce dynamic imbalances. This is because a crankshaft, like other elongated rotating members, can exhibit vibration in multiple modes, just as a plucked string can vibrate at the primary frequency and also at integer multiples of the primary frequency. Thus drilling to remove the primary mode of imbalance or vibration could possibly introduce unwanted vibrations at higher order modes.

The weight splitting control system will be illustrated in conjunction with a measurement station 200, shown in FIGS. 7-20, and a correction station 600, shown in FIGS. 1-6. Crankshaft 1000 to be balanced will be illustrated as crankshaft 1000; however, it should be understood that the principles of the present teachings are equally applicable to balancing any rotating mass, such as a prop, propeller, drive shaft, and the like. The measuring machine is disposed on elongated flexural support legs 204 that allow the body of the measuring machine 200 to vibrate as crankshaft 1000 is spun. Motion sensors 234 disposed in the body of the measuring machine provide electrical signals indicative of the vibrations exhibited by the measuring machine. Such vibrations occur when crankshaft 1000 has an imbalance.

Figure 13:
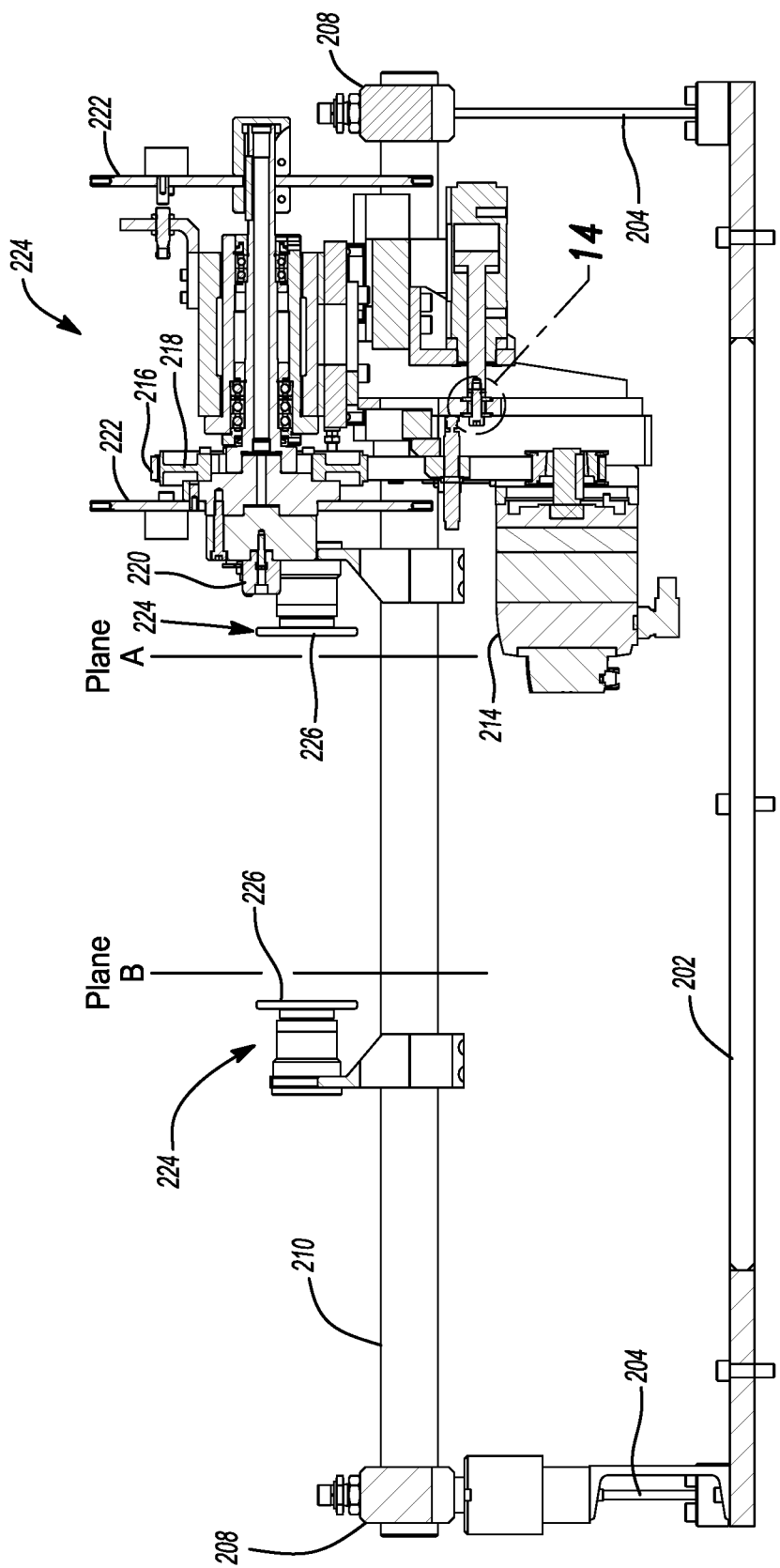
FIG. 13 is a cross-sectional view of a portion of the measurement station taken along line 13-13 of FIG. 10 according to the principles of the present teachings.
Figure 16:
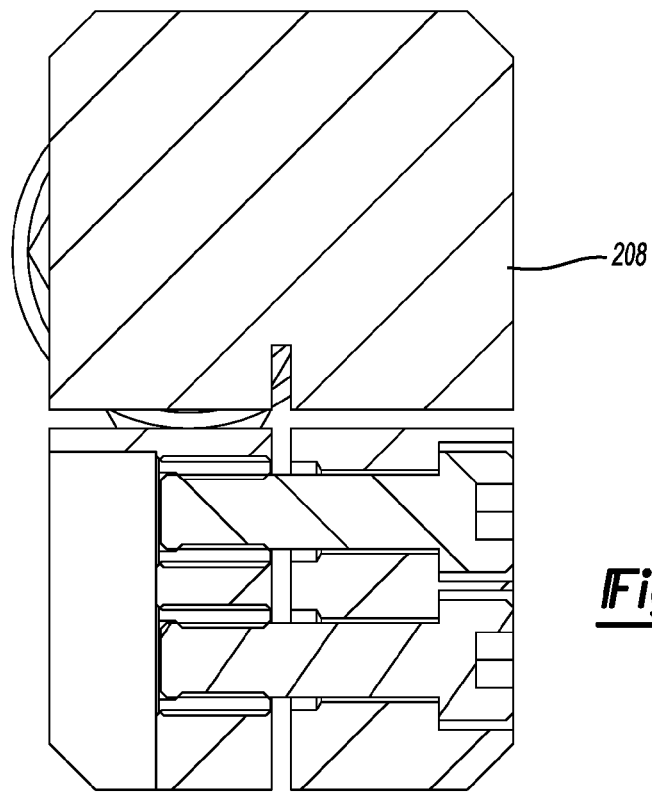
FIG. 16 is a cross-sectional view of a portion of the measurement station taken along line 16-16 of FIG. 15 according to the principles of the present teachings.
Figure 17:
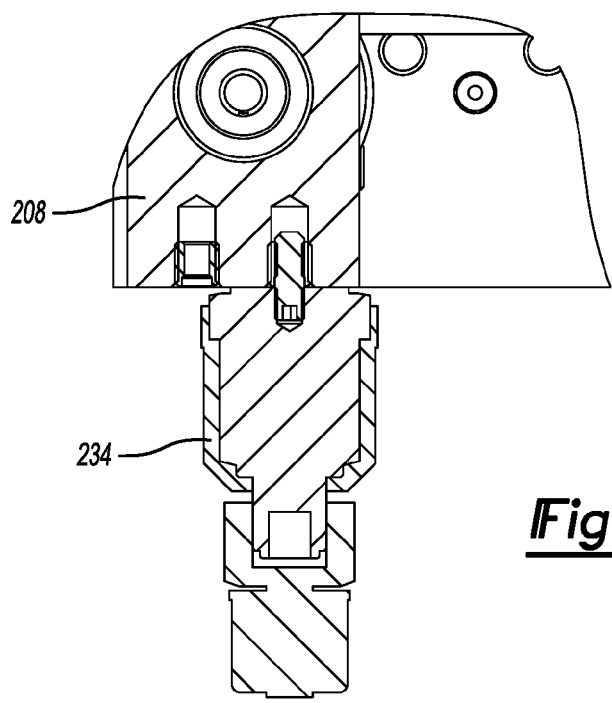
FIG. 17 is a cross-sectional view of a portion of the measurement station taken along line 17-17 of FIG. 9 according to the principles of the present teachings.
Figure 18:
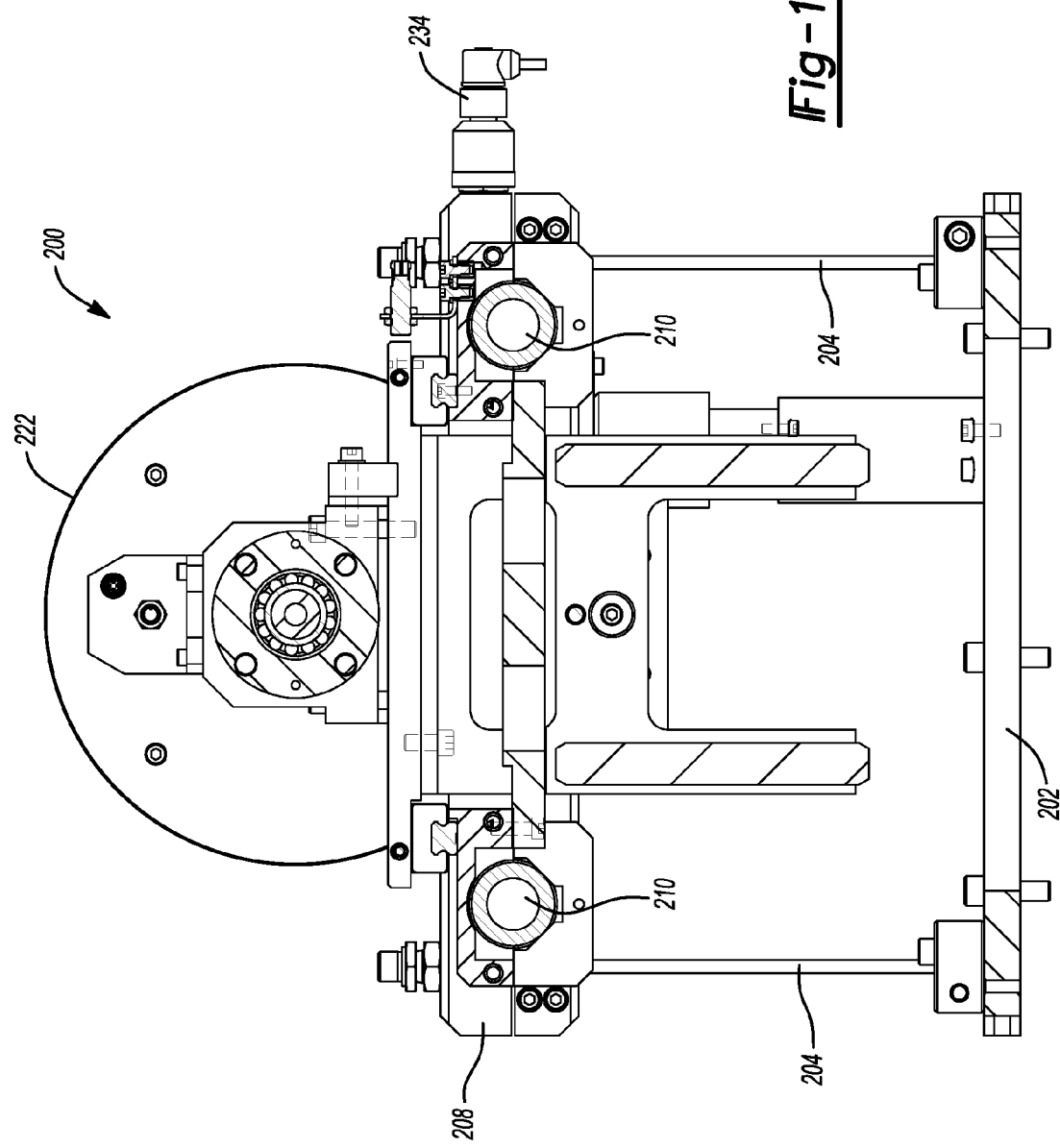
FIG. 18 is a cross-sectional view of a portion of the measurement station taken along line 18-18 of FIG. 9 according to the principles of the present teachings.
Figure 19:
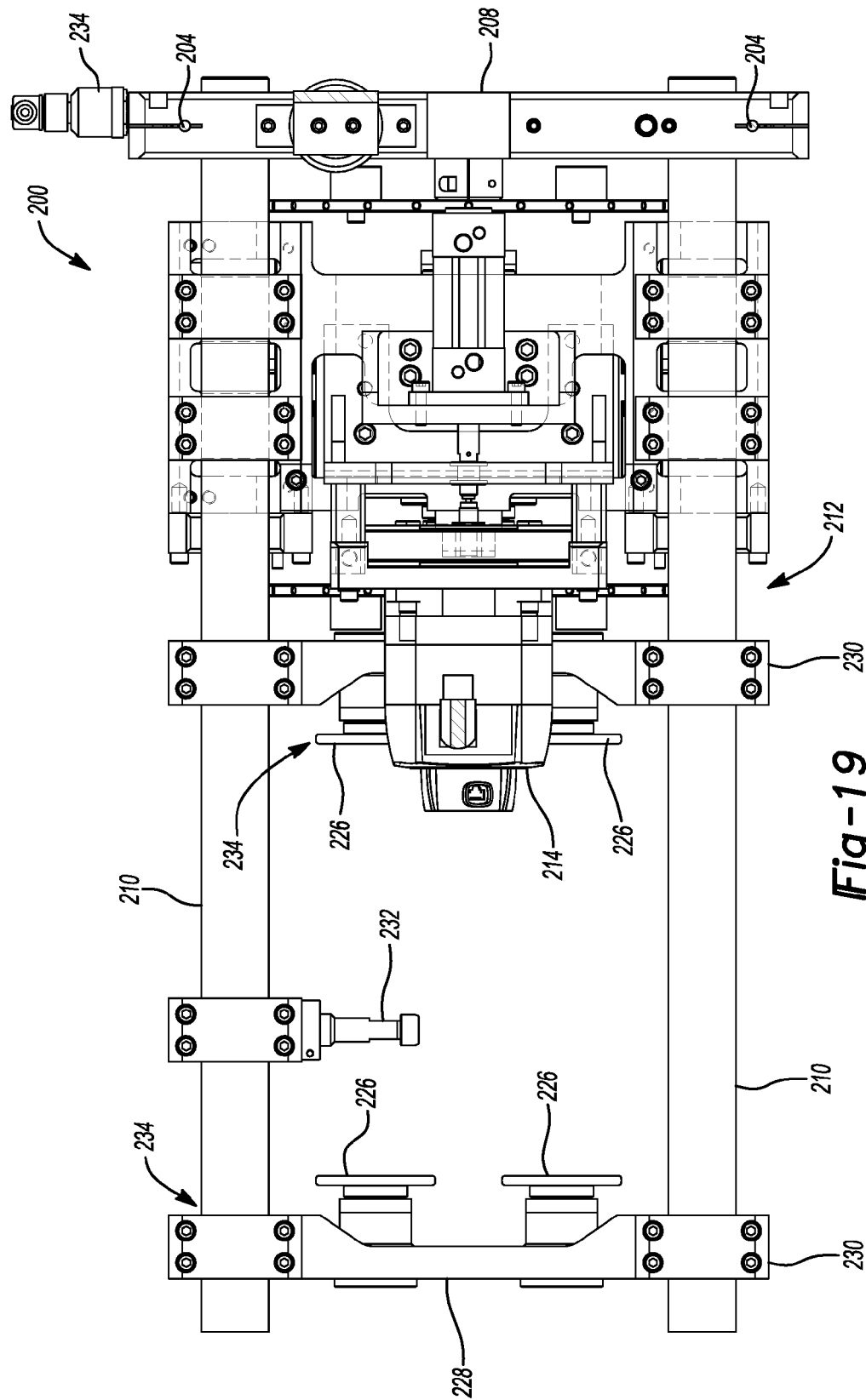
FIG. 19 is a cross-sectional view of a portion of the measurement station taken along line 19-19 of FIG. 9 according to the principles of the present teachings.
Figure 20:
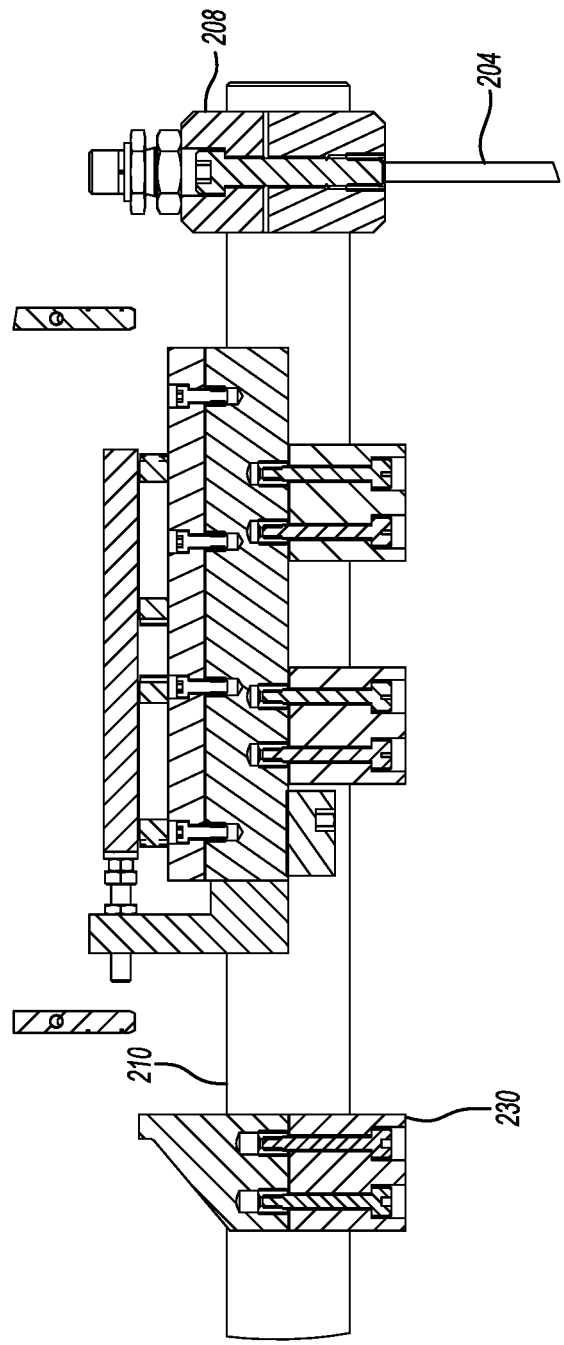
FIG. 20 is a cross-sectional view of a portion of the measurement station taken along line 20-20 of FIG. 10 according to the principles of the present teachings.
Figure 23:
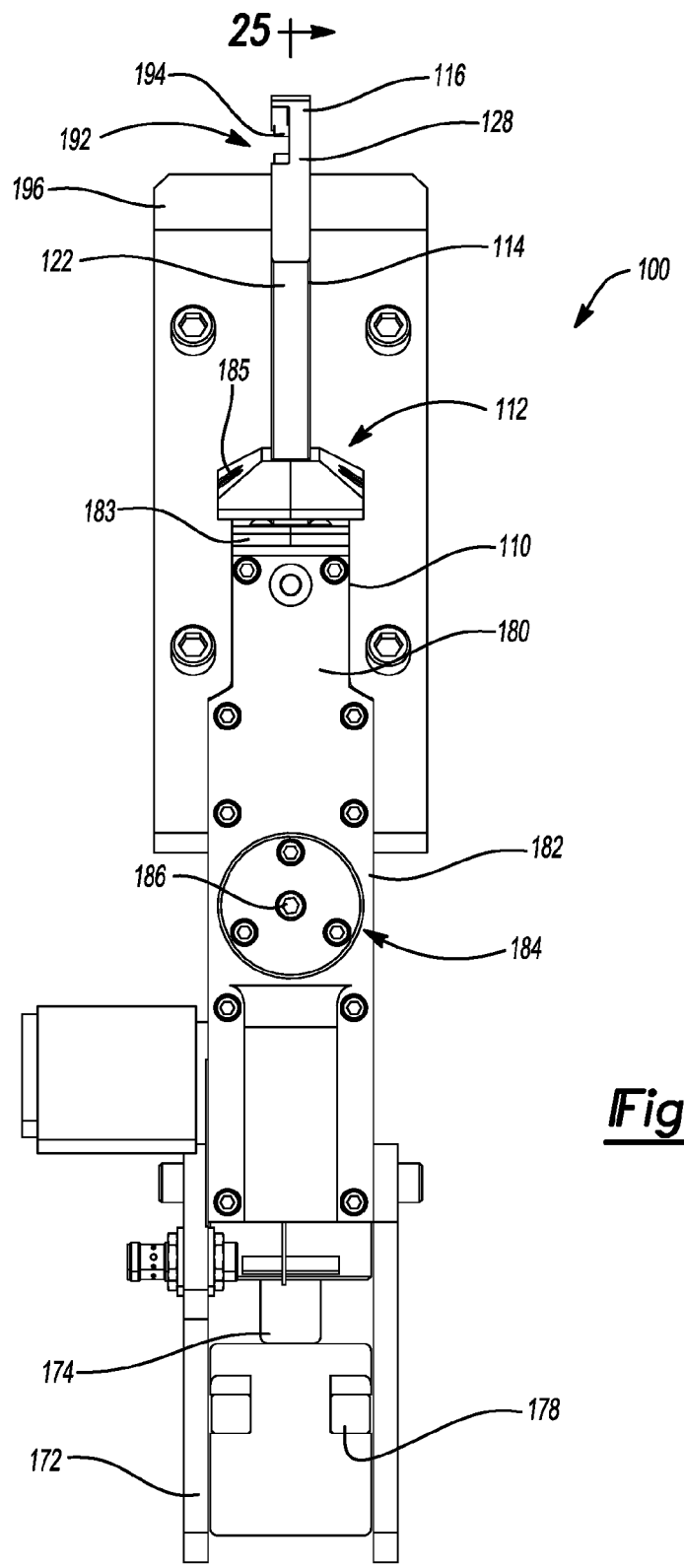
FIG. 23 is a side view of the pneumatic crankshaft clamp assembly according to the principles of the present teachings.
Figure 24:
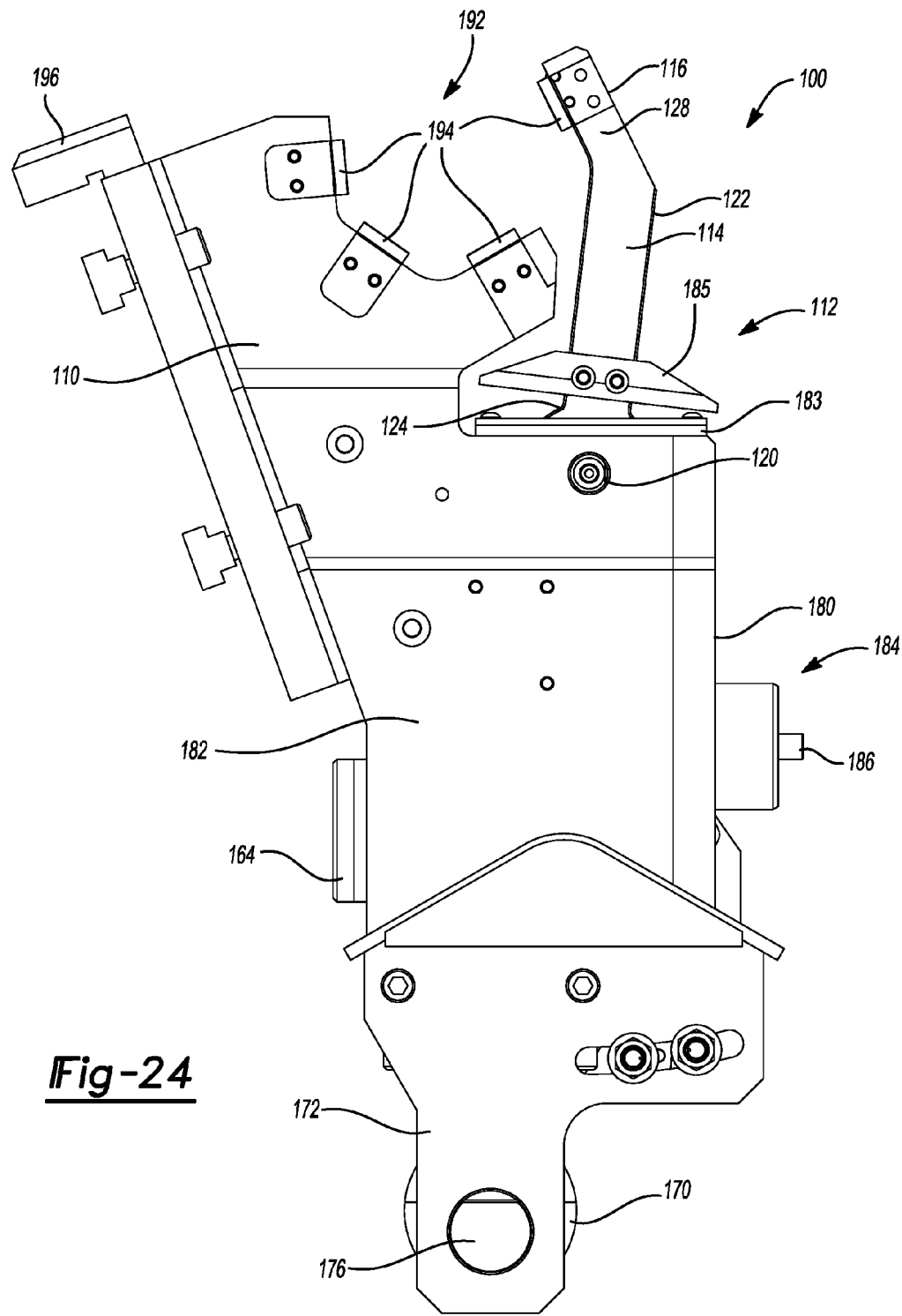
FIG. 24 is a front view of the pneumatic crankshaft clamp assembly according to the principles of the present teachings.
Figure 30:
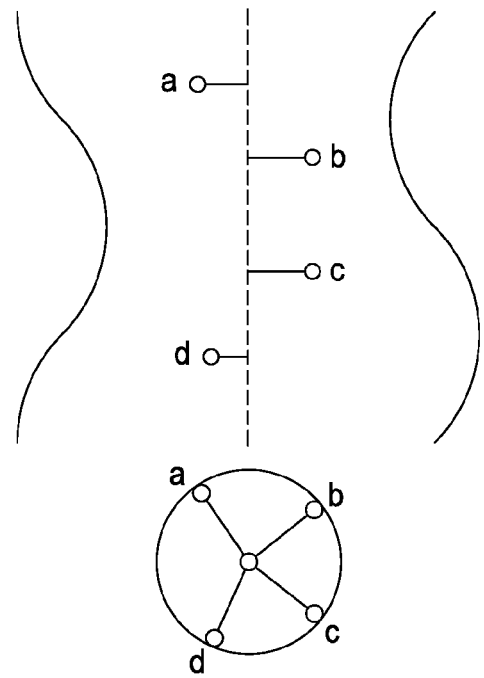
FIG. 30 is a diagram useful in understanding the dynamic vibrational modes of an elongated workpiece.

In the preferred embodiment, the measurement station 200 is calibrated with a test fixture or workpiece of known axial symmetry. During calibration the motion sensor signals are referenced to two parallel and spaced apart reference planes that orthogonally intersect the measurement station 200's axis of rotation. These reference planes are shown in FIG. 13. Using two reference planes allows the motion sensors to provide dynamic data reflecting imbalances in a workpiece. That is, while a single reference plane would be sufficient to measure the first order vibrational mode of crankshaft 1000; two reference planes also capture the second order vibrational mode. See FIG. 30, which illustrates these first and second vibrational modes. Because crankshaft 1000 is clamp at its ends, vibration is zero at the clamping points. Vibration reaches a single maximum in the first vibrational mode, as at 32; whereas vibration exhibits two maxima 34 in the second vibrational mode.

Drill Sites

Crankshaft 1000 typically will have several different locations where material can be removed, as by drilling, to counteract any measured imbalance. In the exemplary crankshaft, shown in FIG. 31, there are N potential drill sites, where N is an integer number. For each of the N sites, the following values are determined and stored in memory: radius, angle, axial location, and maximum drill depth.

Figure 31:
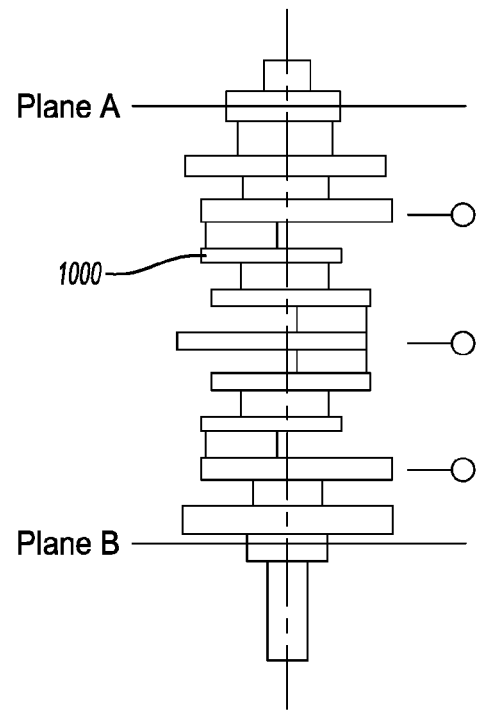
FIG. 31 is a view of an exemplary crankshaft, showing potential drill sites.

FIG. 31 shows how these values are related. Essentially, the entry point of each drill site may be specified by a radius and an angle, measured from a common reference system to which the imbalance vector is also measured. The axial location corresponds to the location along the central axis of the crankshaft 1000 where the drill site is located. Thus the radius, angle and axial location specify a point in three dimensional space. The maximum drill depth is the depth beyond which the drill should not descend. This value is determined based on engineering strength of materials standards.

Processor

Figure 32:
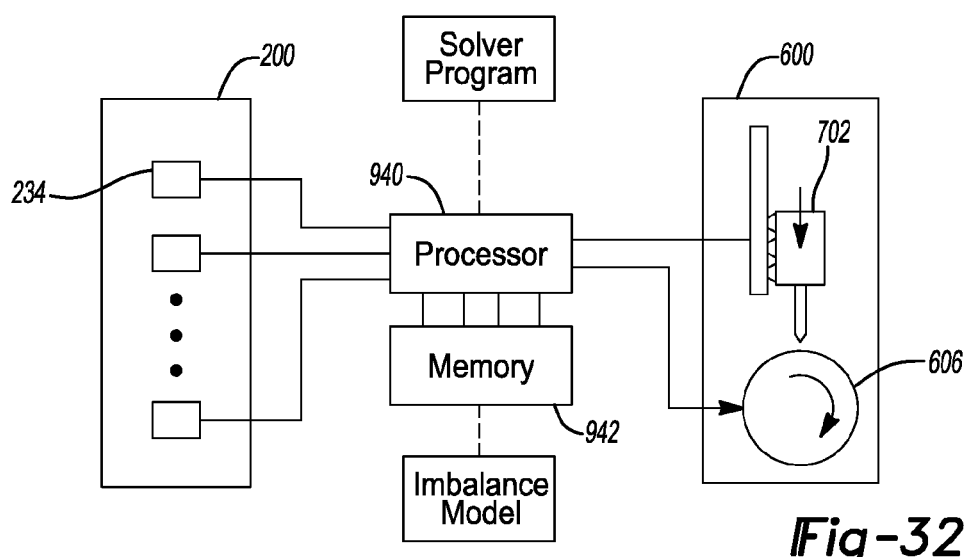
FIG. 32 is an electronic circuit diagram illustrating the processor-based circuit for calculating optimal drill data.

To determine the optimal drill sites and drill depths, a preferred embodiment uses an electronic circuit, as illustrated in FIG. 32, having a processor 940 (e.g. microprocessor or computer) that has associated computer memory 942. The processor is programmed to perform a series of computational steps that determine the optimal drill sites and drill depths that will reduce the measured imbalance to substantially zero or to within a predefined range of substantially zero. The computed optimal drill sites and drill depths are fed as computed values to the correction station 600, which uses the computed values to robotically or automatically control an electrically activated workpiece rotator 606 to rotate crankshaft 1000 to the correct angle, whereupon an automated drilling device 702 removes material to a certain calculated depth.

Figure 33:
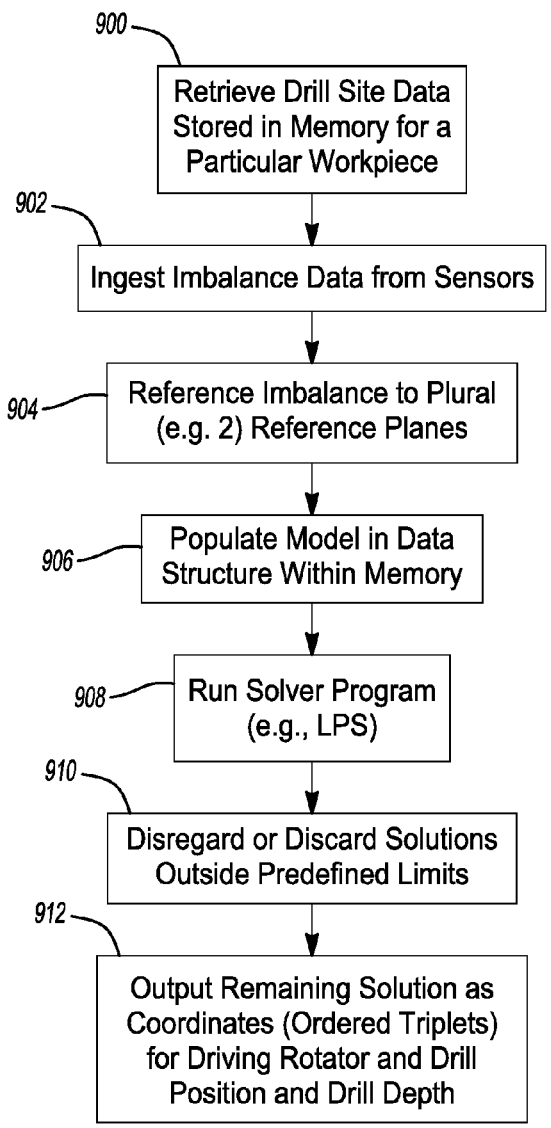
FIG. 33 is a flowchart diagram illustrating how the processor of FIG. 32 is programmed.

The processor is programmed according to the flowchart shown in FIG. 33. Prior to running the program shown in FIG. 33, a set of data are stored for the given workpiece to specify where the potential drill sites are physically located. These data specify: a radius, an angle, and an axial location for each potential drill site. These three values specify a unique point in three-dimensional space using a cylindrical coordinate system. See FIG. 31. If multiple different kinds of workpieces are to be balanced using the disclosed system, an array may be allocated in computer memory, to accommodate values for each different type of workpiece. Alternatively, these drill site data can be stored in a database, which the processor can query to retrieve the drill site data for crankshaft 1000.

As shown in FIG. 33, the processor, at step 900, retrieves the drill site data for crankshaft 1000 and stores that data in memory for subsequent use in performing the described calculations. Next, at step 902, the processor ingests imbalance data from sensors 234. This can be done in real time, as crankshaft 1000 is being rotated on the measurement station 200, or imbalance data can be collected ahead of time and then fed to the processor at step 902.

In the case where the data from sensors 234 represents raw vibrational data, the processor, at step 904, processes this data to obtain plural imbalance values, each corresponding to the imbalance measured with respect to a different reference frame. In the presently preferred embodiment two parallel reference frames are defined during calibration of measurement station 200. As discussed above, multiple separate planes are used, so that the system can measure and correct for first-order, second-order and potentially higher-order vibrational (imbalance) modes. Each imbalance measurement is a vector in weight-radius units, such as gram-centimeter units or the like.

In the preferred embodiment where two parallel reference planes are employed, two imbalance measurements are produced, one from the vantage point of the first parallel reference frame, and one from the vantage point of the second parallel reference frame. As will be discussed below, these two imbalance measurements are processed separately (in parallel) and are then distributed across the length of crankshaft 1000 on a ratio or percentage basis.

Once the imbalance data are ingested, the processor populates a predetermined data structure representing a model of the imbalance problem, as at step 906. A further discussion of the precise details of this model is provided below. Essentially, the model represents a series of constraints, expressed in a form suitable to be manipulated by a computational solver program. In the presently preferred embodiment, the processor performs a linear programming solver program. For this linear programming solver, the model represents a series of constraints expressed as algebraic statements that are populated with values obtained from the retrieved drill site data and from the imbalance measurements taken. Other types of solvers may also be used.

The processor runs the solver program, at step 908, resulting in the computational discovery of one or more solutions that satisfy all of the modeled constraints. In the presently preferred embodiment, solutions that are outside predefined limits are excluded, as shown at step 910. Specifically, solutions specifying negligible drill depth (e.g., a drill depth of zero to a few millimeters) are excluded. After such exclusion, a single optimal solution is obtained.

The optimal solution so obtained is fed to the correction station 600, as at step 912, where the values are exported as three-dimensional vectors or ordered triplets (angle, axial location, depth) used to position crankshaft 1000, align the drill and control the drilling depth for each drill applicable site.

The Model

As will be explained in the Theory section below, the presently preferred model represents the imbalance relative to each of the two parallel planes separately. For each plane the imbalance is a vector quantity, measured in suitable units, such a gm-cm, oz-in, or the like. For explanation purposes here, the letter Z shall be used to represent such imbalance vector. In the presently preferred embodiment, there would actually be two such vector values, one for each parallel reference plane, thus $Z_1$ and $Z_2$. For simplicity, at this point of the discussion, only one vector Z shall be referred to, unless otherwise stated.

Figure 34:
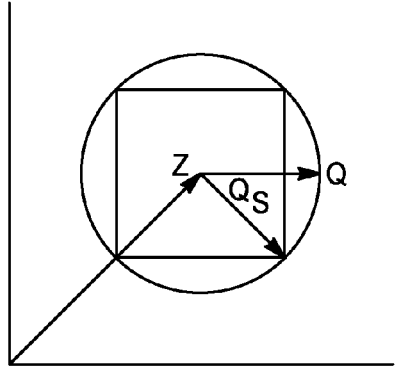
FIG. 34 is a diagram illustrating a presently preferred model by which the processor of FIG. 32 is programmed.

The objective of the solver program is to find the optimal set of offsetting drill site vectors to effectively negate the imbalance represented by Z. While it is theoretically possible to solve to fully offset the imbalance, in most practical applications it is sufficient, and less costly to offset the imbalance to a predefined tolerance. When represented in vector space, a predefined tolerance can be represented as a circle, with radius r, as shown in FIG. 34. From the solver's perspective, a circle represents a nonlinear problem that, while solvable, takes a lot of processor cycles. Therefore, to simplify the problem, the present embodiment uses an approximation of the circle corresponding to a regular polygon, inscribed within the tolerance circle. For illustration purposes, a square is disclosed here. As shown in FIG. 34 the inscribed polygon (e.g., square) represents approximations that all fall within the tolerance radius. Moreover, because the polygon (square) is made up of straight lines, this represents a linear problem for the solver.

Thus in place of the tolerance circle of radius r, the model defines constraints for the solver in terms of the vector positions (x, y positions) of the corners of the inscribed polygon (square). From FIG. 34, it will be appreciated that the (x, y) positions of the four corners of the inscribed square all correspond to offsets from the position of the imbalance vector Z. With this observation in mind, we can now turn to how the model represents the relationship between potential drill site locations and the imbalance vector Z.

Specifically, each drill site corresponds to a radius, an angle and an axial location, as discussed above. For explanation purposes here, the letter $V_i$ shall be used to represent a drill site radius and $\Theta v_i$ shall be used to represent the drill site angle. The drill site angle for each drill site is known from the angular data retrieved and stored in memory at step 900, FIG. 33. The drill site radius corresponds to a drill depth, where the vector $V_i$ points to or terminates at the point where the drill bit stops. In sites that are not drilled, the vector $V_i$ simply points to the surface of the drill site in its non-drilled state.

Thus once the model data structure has been populated with measured values, the solver is solving to determine the drill depth for each site that requires drilling according to the optimal solution discovered by the solver. The following set of equation constraints represents the constraints needed to specify solutions falling within the inscribed square (tolerance zone) shown in FIG. 34. Note that this set of constraints uses N to represent the number of drill sites as referenced to one of the reference planes. In this case two reference planes are used, so another identical set of equation constraints will be defined and solved, for the other plane. In the equations below, $V_i$ is a vector quantity.

$$\min \Sigma_{i=1}^{N} |V_i| \cos \theta \le Q_{1x} \quad \text{(Eq. 1)}$$

$$\min \Sigma_{i=1}^{N} |V_i| \sin \theta \le Q_{1y} \quad \text{(Eq. 2)}$$

$$\min \Sigma_{i=1}^{N} |V_i| \cos \theta \le Q_{2x} \quad \text{(Eq. 3)}$$

$$\min \Sigma_{i=1}^{N} |V_i| \sin \theta \le Q_{2y} \quad \text{(Eq. 4)}$$

$$\min \Sigma_{i=1}^{N} |V_i| \cos \theta \le Q_{3x} \quad \text{(Eq. 5)}$$

$$\min \Sigma_{i=1}^{N} |V_i| \sin \theta \le Q_{3y} \quad \text{(Eq. 6)}$$

$$\min \Sigma_{i=1}^{N} |V_i| \cos \theta \le Q_{4x} \quad \text{(Eq. 7)}$$

$$\min \Sigma_{i=1}^{N} |V_i| \sin \theta \le Q_{4y} \quad \text{(Eq. 8)}$$

When the solver computes the solution to these constraints, it employs a solver algorithm that finds the minimum amount of drilling required to achieve a solution to this set of simultaneous equations. This can be understood from the fact that each constraint equation seeks the min iterative sum for each of the respective (x, y) square corner vector locations.

The presently preferred solver is a linear programming solver that utilizes the simplex technique, the details of which can be found in the literature. By way of implementation example, the Microsoft Foundation Solver may be used. However, it will be appreciated that a variety of different solvers can be used, so long as they can calculate a solution to the set of equation constraints outlined here.

The foregoing constraints are referenced to a particular reference plane. However, as will be appreciated from the example workpiece featured in FIG. 31, the potential drill sits are distributed longitudinally along crankshaft 1000. In other words, each drill site has an axial location along the longitudinal axis of crankshaft 1000. These locations are specified in the data retrieved in step 900, FIG. 33.

Figure 35:
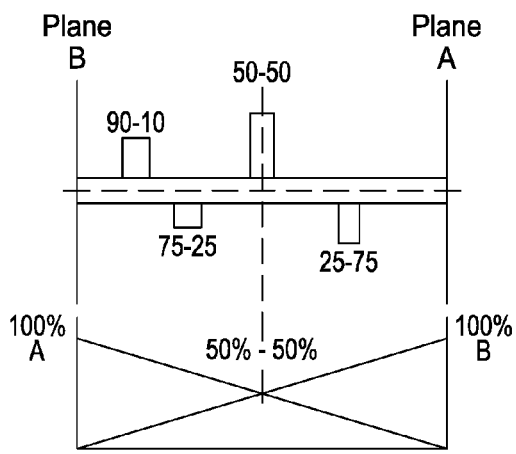
FIG. 35 is a diagram illustrating how the drill site solutions referenced to the respective first and second parallel planes are blended to distribute the solution across the longitudinal axis of the workpiece.

To take the axial location into account, the preferred embodiment uses a blending algorithm that assigns a drill depth for each drill site that is a blend of the resultant solver outputs using a percentage calculation that accounts for where each drill site happens to reside relative to each of the two parallel reference planes. As shown in FIG. 35 a drill site that lies fully within one reference plane receives a 100% contribution from the solver output for that reference plane. Likewise, a drill site that lies fully within the other reference plane receives a 100% contribution from the solver output for that other reference plane. A drill site that lies half-way between the two reference planes receives a 50% contribution from the solver outputs of each of the two reference planes. Other drill sites are computed proportionally in the same fashion.

Theory

Figures 36, 37:
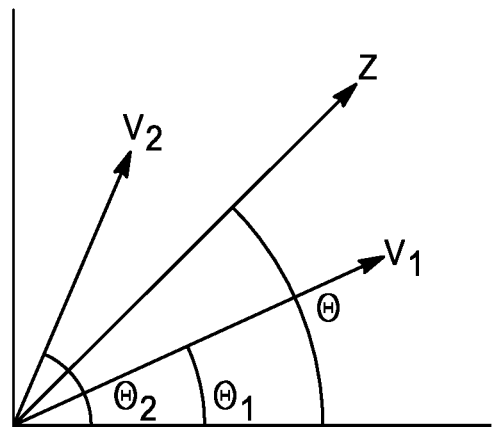
FIG. 36 is a vector diagram useful in understanding the theory behind the general weight splitting concept.
FIG. 37 is a graphical depiction of one of the model constrains, with components labeled to aid in understanding how the data structure of the disclosed constraint model is configured in memory.

The objective of the disclosed model and computer process is to find equivalent vectors Vi that offset the imbalance vector Z. Consider for the moment a simple two-dimensional case where equivalent vectors $V_1$ and $V_2$ are selected to offset imbalance vector Z. Referring to FIG. 36, these equivalent vectors can be related by trigonometric relationships, using the respective angles, as illustrated. In FIG. 36 it will be understood that vectors $V_1$ and $V_2$ represent the vectors where drilling would be applied to offset the imbalance vector. Alternatively, weight can be added corresponding to vectors that are mirror images (180 degrees offset) of vectors $V_1$ and $V_2$.

Using the law of sines, the following relationships among $V_1$ and $V_2$ and Z can be expressed.

$$\frac{V_2}{\sin(|\theta - \theta_1|)} = \frac{V_1}{\sin(|\theta_2 - \theta|)} = \frac{Z}{\sin(180 - \theta_2 - \theta_1)}$$

Therefore, $$V_2 = Z\frac{\sin(|\theta - \theta_1|)}{\sin(\theta_2 - \theta_1)}$$

$$V_1 = Z\frac{\sin(|\theta - \theta_2|)}{\sin(\theta_2 - \theta_1)}$$

Weight splitting at N locations thus becomes a process of finding the absolute values of $V_1, V_2, \ldots V_N$ that are equivalent to Z, given Z and the respective angles $\theta_1, \theta_2, \ldots \theta_N$.

A general theorem of equivalence can be determined when the problem is resolved into Cartesian coordinates as follows.

$$|Z|\cos\theta_2 = \sum_{i=1}^{N}|V_i|\cos\theta_{vi}$$

$$|Z|\sin\theta_2 = \sum_{i=1}^{N}|V_i|\sin\theta_{vi}$$

This results in an infinite number of solutions. A constraint is required to narrow the solutions. Accordingly, we apply the following constraints, the former seeking the minimum value and the latter placing a lower limit $L_i$ and an upper limit $U_i$ to the solutions.

$$\min\sum_{i=1}^{N}|V_i|$$

$$0 > L_i \geq V_i \geq U_i$$

These constraints will minimize the total number of vectors required to reach Z.

In many practical applications it may not be necessary to exactly offset the imbalance vector Z. Rather, an acceptable tolerance range can be defined in terms of a quality radius Q, shown in FIG. 34. Thus the processor is programmed to find a solution that is anywhere within the acceptable region of Z, namely within the circle of radius Q.

In order to find a solution within a circle of radius Q, the solver will need to process nonlinear conditions, as the circle defines a curved, nonlinear locus. It is possible to solve such a nonlinear constraint using a nonlinear linear programming solver (NLPS). However, the processing cycle time required to perform the NLPS algorithm can be unacceptably long in some instances. Thus the disclosed embodiment employs a simplifying approximation that results in linear constraints that can be solved using a linear programming solver (LPS).

Specifically, the disclosed program process uses an inscribed polygon, in this case a square, to represent an approximation of the quality circle of radius Q. It will be appreciated that any solution that lies on any of the four sides of this square naturally fall within the acceptable radius Q. Indeed, the solutions correspond to the radius Q at the four vertices of the inscribed square. Elsewhere, the sides of the square represent better tolerance than defined by the circle of radius Q.

It will thus be appreciated that the model defined by Eq. 1-8 above are seeing to minimize the vector V associated with each of the four vertices of the inscribed square approximation. Note there are eight equations (Eq. 1-8) because each of the four vertices has an x-component and a y-component when represented in Cartesian coordinates. If a higher order polygon is used in place of the square, a correspondingly larger number of equations would be used to define the constraint model.

FIG. 37 shows one of the constraint model equations, with the equation elements labeled for better understanding.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A crankshaft balancer machine for balancing a crankshaft, the crankshaft balancer machine comprising:
   a measurement station configured to rotate the crankshaft to obtain vibration-related data, the measurement station having a base structure, a measurement bridge support, a plurality of flexural support legs extending between the base structure and the measurement bridge support, and a drive system configured to rotate the crankshaft, the measurement station having at least one sensor for detecting an imbalance and outputting imbalance data;
   a transfer station configured to transfer the crankshaft between the measurement station and a correction station, the transfer station having a least one lifting arm selectively engaging the crankshaft and supporting the crankshaft during transfer; and
   the correction station configured to drill at least a portion of the crankshaft to correct an imbalance in response to the imbalance data, the correction station having a bridge support structure supporting the crankshaft and a drilling device, the drilling device being horizontally disposed to achieve a horizontal drill direction into the crankshaft, the correction station having a positioning system positioning the drilling device relative to the crankshaft.

2. The crankshaft balancer machine according to claim 1 wherein the correction station comprises:
   a solution processor having associated memory and being programmed to receive the imbalance data;
   the associated memory being programmed according to a predefined model data structure to store the imbalance data and also store data indicative of the geometry of the crankshaft;
   the model data structure storing crankshaft geometry data representing the location of at least one crankshaft modification site, referenced to at least one predetermined reference frame;
   the solution processor being programmed to execute a solver program that seeks at least one solution to reduce the imbalance, using the model data structure as solver constraints; and
   the solution processor outputting the at least one solution as imbalance reduction data representing the location of at least one crankshaft modification site together with a datum indicative of a weight to be removed from the crankshaft at the modification site;

wherein the correction station is configured to drill the crankshaft at the at least one crankshaft modification site to remove the datum indicated weight.

3. The crankshaft balancer machine according to claim 2 wherein the model data structure stores the imbalance data associated with a predetermined tolerance.

4. The crankshaft balancer machine according to claim 3 wherein the predetermined tolerance is linearly modeled in said model data structure.

5. The crankshaft balancer machine according to claim 3 wherein the predetermined tolerance is modeled as a regular polygon inscribed within a circular locus defined by the imbalance data.

6. The crankshaft balancer machine according to claim 2 wherein the model data structure stores crankshaft geometry data representing the location of at least one crankshaft modification site, referenced to at least two predetermined spaced apart and parallel reference frames that lie perpendicular to the longitudinal axis of the crankshaft.

7. The crankshaft balancer machine according to claim 6 wherein the solution processor is programmed to calculate a solver solution for each of the two reference frames and to allocate proportional fractions of each solution according to the longitudinal position of the crankshaft modification site.

8. A crankshaft balancer machine for balancing a crankshaft, the crankshaft balancer machine comprising:
  a measurement station configured to rotate the crankshaft to obtain vibration-related data, the measurement station having a base structure, a measurement bridge support, a plurality of flexural support legs extending between the base structure and the measurement bridge support, and a drive system configured to rotate the crankshaft, the measurement station having at least one sensor for detecting an imbalance and outputting imbalance data;
  a transfer station configured to transfer the crankshaft between the measurement station and a correction station, the transfer station having a least one lifting arm selectively engaging the crankshaft and supporting the crankshaft during transfer; and
  the correction station configured to drill at least a portion of the crankshaft to correct an imbalance in response to the imbalance data, the correction station having a bridge support structure supporting the crankshaft and a drilling device, the drilling device being horizontally disposed to achieve a horizontal drill direction into the crankshaft, the correction station having a positioning system positioning the drilling device relative to the crankshaft,
  wherein the measurement system comprises:
  the base structure;
  a measurement bridge structure having a pair of support tubes disposed in parallel, a pair of end bracket supports interconnecting adjacent ends of the pair of support tubes, and at least one roller bridge assembly configured to rotationally support the crankshaft;
  the plurality of flexural support legs extending between the base structure and the measurement bridge structure, the plurality of flexural support legs being sized and shaped to permit flexure of the measurement bridge structure relative to the base structure;
  the drive system having a drive shaft connectable to the crankshaft and a compensating plate disposed adjacent to the crankshaft, the drive system rotating the crankshaft via a transmission coupled adjacent the compensating plate; and
  the at least one sensor coupled to the measurement bridge structure for detecting an imbalance in the crankshaft during rotation and outputting imbalance data.

9. The crankshaft balancer machine according to claim 8 wherein the at least one roller bridge assembly comprises:
  the bridge support clampingly coupled to at least one of the pair of support tubes; and
  at least one roller configured to support the crankshaft.

10. The crankshaft balancer machine according to claim 8 wherein the plurality of flexural support legs are generally cylindrical in cross-section.

11. The crankshaft balancer machine according to claim 8 wherein the plurality of flexural support legs are generally parallel to each other and extend vertically between the base structure and the measurement bridge support.

12. The crankshaft balancer machine according to claim 8 wherein the drive system comprises a motor operably coupled to the drive shaft via a drive transmission.

13. The crankshaft balancer machine according to claim 12 wherein the drive system further comprises at least one compensating plate operably coupled to the drive shaft for rotation therewith.

14. The crankshaft balancer machine according to claim 8 wherein the sensor is a selected from the group consisting of accelerometers, two-axis accelerometers, three-axis accelerometers, velocity sensors, proximity sensors, and magnetic sensors.

15. A crankshaft balancer machine for balancing a crankshaft, the crankshaft balancer machine comprising:
  a measurement station configured to rotate the crankshaft to obtain vibration-related data, the measurement station having a base structure, a measurement bridge support, a plurality of flexural support legs extending between the base structure and the measurement bridge support, and a drive system configured to rotate the crankshaft, the measurement station having at least one sensor for detecting an imbalance and outputting imbalance data;
  a transfer station configured to transfer the crankshaft between the measurement station and a correction station, the transfer station having a least one lifting arm selectively engaging the crankshaft and supporting the crankshaft during transfer; and
  the correction station configured to drill at least a portion of the crankshaft to correct an imbalance in response to the imbalance data, the correction station having a bridge support structure supporting the crankshaft and a drilling device, the drilling device being horizontally disposed to achieve a horizontal drill direction into the crankshaft, the correction station having a positioning system positioning the drilling device relative to the crankshaft, wherein the correction station comprises one or more pneumatic crankshaft clamp assemblies configured to retain the crankshaft upon the bridge support structure during horizontal drilling of the crankshaft,
  wherein the one or more pneumatic crankshaft clamp assemblies comprises:
  a housing for at least partially supporting the crankshaft, the housing having a piston cylinder, a clamp inlet port fluidly coupled to the piston cylinder, and an unclamp inlet port fluidly coupled to the piston cylinder;

a clamp arm operably coupled to the housing for pivotal movement about a pivot axis between a clamp position and an unclamp position, the clamp arm having a proximal end and a distal end, the distal end configured to engage the crankshaft to retain the crankshaft in contact with the housing in the clamp position and be spaced apart from the crankshaft in the unclamp position, the proximal end having a cam follower; and a pneumatic piston operably disposed within the piston cylinder, the pneumatic piston being moveable within the piston cylinder in response to pneumatic pressure from the clamp inlet port and the unclamp inlet port between a clamp position and an unclamp position, the pneumatic piston having a cam formed along a side portion thereof, wherein the cam follower of the lifting arm is biased into contact with the cam formed on the pneumatic piston such that the lifting arm moves from the unclamp position to the clamp position in response to pneumatic pressure introduced from the clamp inlet port causing the pneumatic piston to move from the unclamp position to the clamp position.

16. The crankshaft balancer machine according to claim 15 wherein the lifting arm further moves from the clamp position to the unclamp position in response to pneumatic pressure introduced from the unclamp inlet port causing the pneumatic piston to move from the clamp position to the unclamp position.

17. The crankshaft balancer machine according to claim 15 further comprising:

an override system configured to urge clamp arm from the clamp position to the unclamp position against the force of the pneumatic piston.

18. The crankshaft balancer machine according to claim 17 wherein the override system comprises an override cam member being selectively engageable with the pneumatic piston to urge the pneumatic piston from the clamp position to the unclamp position against the pneumatic pressure from the clamp inlet port.

19. The crankshaft balancer machine according to claim 18 wherein the pneumatic piston comprises a cam follower rod extending therefrom and the override system comprises an override cam member, the cam follower rod of the pneumatic piston cammingly engaging the override cam member, wherein rotational movement of the override cam member causes translational movement of the pneumatic piston from the clamp position to the unclamp position.

20. The crankshaft balancer machine according to claim 1 wherein the positioning system is configured to move the drilling device of the correction station along a horizontal stroke.

* * * * *